(12) United States Patent
Shuto et al.

(10) Patent No.: US 10,087,499 B2
(45) Date of Patent: Oct. 2, 2018

(54) HOT-ROLLED STEEL SHEET AND MANUFACTURING METHOD THEREOF

(71) Applicant: NIPPON STEEL & SUMITOMO METAL CORPORATION, Tokyo (JP)

(72) Inventors: Hiroshi Shuto, Tokyo (JP); Tatsuo Yokoi, Tokyo (JP); Yuuki Kanzawa, Tokyo (JP); Nobuhiro Fujita, Tokyo (JP); Ryohta Niiya, Tokyo (JP); Shinya Saitoh, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 185 days.

(21) Appl. No.: 14/370,158

(22) PCT Filed: Dec. 27, 2012

(86) PCT No.: PCT/JP2012/083918
§ 371 (c)(1),
(2) Date: Jul. 1, 2014

(87) PCT Pub. No.: WO2013/103125
PCT Pub. Date: Jul. 11, 2013

(65) Prior Publication Data
US 2015/0017471 A1    Jan. 15, 2015

(30) Foreign Application Priority Data

Jan. 5, 2012   (JP) ................................ 2012-000484

(51) Int. Cl.
| | |
|---|---|
| *C21D 8/02* | (2006.01) |
| *C22C 38/06* | (2006.01) |
| *C22C 38/00* | (2006.01) |
| *C22C 38/02* | (2006.01) |
| *C22C 38/04* | (2006.01) |

(Continued)

(52) U.S. Cl.
CPC ............ *C21D 8/0263* (2013.01); *B32B 15/01* (2013.01); *C21D 8/0226* (2013.01); *C22C 38/00* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/20* (2013.01); *C22C 38/26* (2013.01); *C22C 38/28* (2013.01); *C21D 1/25* (2013.01); *C21D 9/46* (2013.01); *C21D 2201/05* (2013.01); *C21D 2211/002* (2013.01); *C21D 2211/008* (2013.01);

(Continued)

(58) Field of Classification Search
CPC ............... C21D 1/25; C21D 2201/05; C21D 2211/002; C21D 2211/008; C21D 8/0226; C21D 8/0263; C21D 9/46; C22C 38/00; C22C 38/001; C22C 38/002; C22C 38/005; C22C 38/008; C22C 38/02; C22C 38/04; C22C 38/14; C22C 38/28
See application file for complete search history.

(56) References Cited

U.S. PATENT DOCUMENTS

| | | | | |
|---|---|---|---|---|
| 2002/0007882 A1* | 1/2002 | Inoue | ................... | C21D 8/0226 148/541 |
| 2003/0196735 A1 | 10/2003 | Sugiura et al. | | |

(Continued)

FOREIGN PATENT DOCUMENTS

| | | |
|---|---|---|
| CA | 2 851 325 A1 | 5/2013 |
| CN | 1462317 A | 12/2003 |

(Continued)

OTHER PUBLICATIONS

J.R. Davis, Surface Engineering of Carbon and Alloy Steels, Surface Engineering, vol. 5, ASM Handbook, ASM International, 1994, p. 701-740 (Year: 1994).*
Canadian Office Action, dated Nov. 4, 2015, for corresponding Canadian Application No. 2,860,165.
Korean Office Action, dated Oct. 8, 2015, for corresponding Korean Application No. 10-2014-7018228, with a partial English translation.

(Continued)

*Primary Examiner* — Colleen P Dunn
*Assistant Examiner* — Nicholas A Wang
(74) *Attorney, Agent, or Firm* — Birch, Stewart, Kolasch & Birch, LLP

(57) ABSTRACT

There are provided a high-strength hot-rolled steel sheet securing low-temperature toughness and having excellent stretch flangeability by controlling a structural fraction and a hardness difference among structures, and a manufacturing method thereof. A hot-rolled steel sheet contains: C: 0.01 to 0.2%; Si: 0.001 to 2.5% or less; Mn: 0.10 to 4.0% or less; P: 0.10% or less; S: less than 0.03%; Al: 0.001 to 2.0%; N: less than 0.01%; Ti: (0.005+48/14[N]+48/32[S]) % or more and 0.3% or less; Nb: 0 to 0.06%; Cu: 0 to 1.2%; Ni: 0 to 0.6%; Mo: 0 to 1%; V: 0 to 0.2%; Cr: 0 to 2%; Mg: 0 to 0.01%; Ca: 0 to 0.01%; REM: 0 to 0.1%; and B: 0 to 0.002%, and has: an texture in which, at a central portion of a sheet thickness located between ⅜ to ⅝ thickness positions of the sheet thickness from a surface of the steel sheet, an average value of X-ray random intensity ratios of a group of {100}<011> to {223}<110> orientations of a sheet plane is 6.5 or less and an X-ray random intensity ratio of a {332}<113> crystal orientation is 5.0 or less; and a microstructure in which a total area ratio of tempered martensite, martensite and lower bainite is more than 85%, and an average crystal grain diameter is 12.0 μm or less.

12 Claims, No Drawings

(51) Int. Cl.
  *C22C 38/12* (2006.01)
  *C22C 38/14* (2006.01)
  B32B 15/01 (2006.01)
  *C22C 38/08* (2006.01)
  *C22C 38/20* (2006.01)
  *C22C 38/26* (2006.01)
  *C22C 38/28* (2006.01)
  *C21D 9/46* (2006.01)
  *C21D 1/25* (2006.01)
  *C23C 2/02* (2006.01)
  *C25D 5/36* (2006.01)

(52) U.S. Cl.
  CPC ............... *C23C 2/02* (2013.01); *C25D 5/36* (2013.01); *Y10T 428/12799* (2015.01)

(56) References Cited

U.S. PATENT DOCUMENTS

| | | |
|---|---|---|
| 2004/0244877 A1 | 12/2004 | Yokoi et al. |
| 2009/0252641 A1 | 10/2009 | Hoshi et al. |
| 2010/0047617 A1 | 2/2010 | Sugiura et al. |
| 2013/0095347 A1 | 4/2013 | Kawasaki et al. |
| 2013/0153091 A1* | 6/2013 | Fujita .................. C21D 8/0226 148/504 |
| 2013/0323112 A1 | 12/2013 | Okamoto et al. |

FOREIGN PATENT DOCUMENTS

| | | | |
|---|---|---|---|
| CN | 101535519 A | | 9/2009 |
| EP | 2581465 A1 | | 4/2013 |
| JP | 8-311600 A | | 11/1996 |
| JP | 9-202940 A | | 8/1997 |
| JP | 2003-160836 A | | 6/2003 |
| JP | 2005-206920 A | | 8/2005 |
| JP | 2009-263715 A | | 11/2009 |
| JP | 2009-263718 A | | 11/2009 |
| JP | 2009263715 | * | 11/2009 |
| JP | 2011-17044 A | | 1/2011 |
| JP | 2011-52321 A | | 3/2011 |
| JP | WO2012014926 | * | 2/2012 |
| JP | 7-252592 A | | 9/2012 |
| KR | 10-2009-0086401 A | | 8/2009 |
| TW | 200517507 A | | 6/2005 |
| WO | WO 2005/005670 A1 | | 1/2005 |
| WO | WO 2011/158818 A1 | | 12/2011 |
| WO | WO 2012/014926 A1 | | 2/2012 |
| WO | WO 2012/121219 A1 | | 9/2012 |

OTHER PUBLICATIONS

Extended European Search Report, dated Mar. 18, 2016, for European Application No. 12864393.9.
Chinese Office Action and Search Report, dated Aug. 13, 2015, for Chinese Application No. 201280065876.3, along with a partial English translation of the Chinese Office Action.
Ma et al., "Tensile Behavior of AA3104 Aluminum Sheets at Low Deformation Degree," Journal of University of Science and Technology Beijing, vol. 12, No. 5, Oct. 2005, pp. 422-426.
Taiwanese Office Action dated Aug. 20, 2014, issued in corresponding Taiwanese Patent Application No. 10321131780.
International Search Report for PCT/JP2012/083918 dated Mar. 19, 2013.
Kishida, "High Strength Steel Sheets for Light Weight Vehicle", Nippon Steel Technical Report, No. 81, Jan. 2000, pp. 12-16.
Sugimoto et al., "Stretch-flangeability of a High-strength TRIP Type Bainitic Sheet Steel", ISIJ International, vol. 40, No. 9, 2000, pp. 920-926.
Written Opinion Opinion of the International Searching Authority for PCT/JP2012/083918 dated Mar. 19, 2013.
European Office Action for European Application No. 12864393.9, dated Sep. 26, 2016.
Mexican Office Action, dated Apr. 10, 2018, for corresponding Mexican Application No. MX/a/2014/008124, with English translation.

* cited by examiner

HOT-ROLLED STEEL SHEET AND MANUFACTURING METHOD THEREOF

TECHNICAL FIELD

The present invention relates to a hot-rolled steel sheet and a manufacturing method thereof. More specifically, the present invention relates to a high-strength hot-rolled steel sheet excellent in stretch flangeability and low-temperature toughness, and a manufacturing method thereof.

BACKGROUND ART

In order to suppress emission of carbon dioxide gas from an automobile, reduction of weight of an automobile body is promoted by using a high-strength steel sheet. Further, in order to ensure safety of passengers, the high-strength steel sheet has become widely used, in addition to a soft steel sheet, for the automobile body. Furthermore, in order to promote reduction of weight of the automobile body in future, it is necessary to increase the strength level of the high-strength steel sheet more than before, but the increase in strength of the steel sheet is generally accompanied by deterioration of material properties such as formability (workability). Therefore, how the strength is increased without deteriorating the material properties is important in developing the high-strength steel sheet. Particularly, a steel sheet used as a material of automobile members such as an inner sheet member, a structure member, and an underbody member is required to have stretch flange workability, burring workability, ductility, fatigue durability, impact resistance, corrosion resistance, and so on according to its usage. It is important how these material properties and high strength property are ensured in a high-dimensional and well-balanced manner.

Further, the steel sheet used as the material of those members needs to be improved also in low-temperature toughness so as to be resistant to destruction even when being subjected to impact caused by collision or the like after they are attached to the automobile as members after molding, particularly to secure the impact resistance in a cold district. This low-temperature toughness is defined by vTrs (Charpy fracture appearance transition temperature) or the like. For this reason, it is also necessary to consider the impact resistance itself of the above-described steel sheet.

That is, the steel sheet used as the material of parts including the above-described members is required to have the low-temperature toughness as a very important characteristic, in addition to excellent workability.

As for the improving method of the low-temperature toughness in the high-strength steel sheet, its manufacturing methods are disclosed, for example, in Patent Documents 1, 2, in which the low-temperature toughness is improved by a method including a martensite phase adjusted in aspect ratio as the main phase (Patent Document 1), and a method of finely precipitating carbide in ferrite having an average grain diameter of 5 to 10 μm (Patent Document 2).

However, in Patent Documents 1 and 2, nothing is mentioned about the stretch flangeability and poor forming may be caused when applying the steel sheet to a member that is to be subjected to burring. Further, also in a steel pipe field and a thick plate field, there is knowledge about improvement of the low-temperature toughness but the formability as high as that of a thin plate is not required, and there is similar concern.

As for the improving method of the stretch flangeability in the high-strength steel sheet, a metal structure control method of a steel sheet for improving local ductility is also disclosed, and that controlling inclusions, making a single structure, and reducing the hardness difference among structures are effective for the bendability and the stretch flangeability is disclosed in Non-Patent Document 1. Further, a technique of improving the strength, the ductility and the stretch flangeability by controlling the finishing temperature of hot rolling, and the reduction ratio and the temperature range of finish rolling, to promote the recrystallization of austenite, suppressing development of a rolled texture, and randomizing the crystal orientations is disclosed in Non-Patent Document 2.

It is conceivable to be able to improve the stretch flangeability by uniformizing the metal structure and the rolled texture from Non-Patent Documents 1, 2 in which, however, no consideration is made for compatibility between the low-temperature toughness and the stretch flangeability.

For compatibility between the stretch flangeability and the low-temperature toughness is mentioned in Patent Document 3 which discloses a technology of dispersing appropriate amounts of retained austenite and bainite in a ferrite phase with controlled hardness and grain diameter. However, it is a structure containing soft ferrite at 50% or more and is thus difficult to respond to the demand for higher strength in recent years.

PRIOR ART DOCUMENT

Patent Document

Patent Document 1: Japanese Laid-open Patent Publication No. 2011-52321
Patent Document 2: Japanese Laid-open Patent Publication No. 2011-17044
Patent Document 3: Japanese Laid-open Patent Publication No. H7-252592

Non-Patent Document

Non-Patent Document 1: K. Sugimoto et al, "ISIJ International" (2000) Vol. 40, p. 920
Non-Patent Document 2: Kishida, "Shinnittetsu giho" (1999) No. 371, p. 13

DISCLOSURE OF THE INVENTION

Problems to be Solved by the Invention

The present invention has been devised in consideration of the above-described problems and its object is to provide a hot-rolled steel sheet, in particular, a hot-rolled steel sheet having high strength and being excellent in stretch flangeability and low-temperature toughness, and a manufacturing method capable of stably manufacturing the steel sheet.

Means for Solving the Problems

The present inventors succeeded in manufacturing a steel sheet excellent in stretch flangeability and low-temperature toughness by optimizing the chemical composition and manufacturing conditions of a high-strength hot-rolled steel sheet and controlling an texture and a microstructure of the steel sheet. The gist thereof is as follows.

(1) A hot-rolled steel sheet including:
a chemical composition including: in mass %,
C: 0.01 to 0.2%;
Si: 0.001 to 2.5%;

Mn: 0.10 to 4.0%;
P: 0.10% or less;
S: 0.030% or less;
Al: 0.001 to 2.0%;
N: 0.01% or less;
Ti: (0.005+48/14[N]+48/32[S])%≤Ti≤0.3%;
Nb: 0 to 0.06%;
Cu: 0 to 1.2%;
Ni: 0 to 0.6%;
Mo: 0 to 1%;
V: 0 to 0.2%;
Cr: 0 to 2%;
Mg: 0 to 0.01%;
Ca: 0 to 0.01%;
REM: 0 to 0.1%; and
B: 0 to 0.002%,
with a balance being composed of Fe and impurities;
an texture in which, at a central portion of a sheet thickness that is a steel sheet portion sectioned at a ⅜ thickness position and a ⅝ thickness position of the sheet thickness from a surface of the steel sheet, an average value of X-ray random intensity ratios of a group of {100}<011> to {223}<110> orientations of a sheet plane is 6.5 or less and an X-ray random intensity ratio of a {332}<113> crystal orientation is 5.0 or less; and
a microstructure in which a total area ratio of tempered martensite, martensite and lower bainite is more than 85%, and an average crystal grain diameter is 12.0 μm or less.

(2) The hot-rolled steel sheet according to (1), wherein the chemical composition contains one or two or more selected from a group consisting of: in mass %,
Nb: 0.005 to 0.06%;
Cu: 0.02 to 1.2%;
Ni: 0.01 to 0.6%;
Mo: 0.01 to 1%;
V: 0.01 to 0.2%; and
Cr: 0.01 to 2%.

(3) The hot-rolled steel sheet according to (1) or (2), wherein the chemical composition contains one or two or more selected from a group consisting of: in mass %, Mg: 0.0005 to 0.01%, Ca: 0.0005 to 0.01%, and REM: 0.0005 to 0.1%.

(4) The hot-rolled steel sheet according to any one of (1) to (3), wherein the chemical composition contains, in mass %, B: 0.0002 to 0.002%.

(5) The hot-rolled steel sheet according to any one of (1) to (4), including the microstructure in which assuming that an average value of hardness is E (HV0.01) and a standard deviation is σ (HV0.01) when measuring the Vickers hardness at 100 points or more with a load of 0.098 N, σ (HV0.01)/E (HV0.01) is 0.08 or less.

(6) The hot-rolled steel sheet according to any one of (1) to (5), including mechanical properties that an r value (rC) in a direction perpendicular to a rolling direction is 0.70 or more, and an r value (r30) in a direction 30° from the rolling direction is 1.10 or less.

(7) The hot-rolled steel sheet according to any one of (1) to (6), including mechanical properties that an r value (rL) in a rolling direction is 0.70 or more and an r value (r60) in a direction 60° from the rolling direction is 1.10 or less.

(8) The hot-rolled steel sheet according to any one of (1) to (7), including a plating layer provided on the surface of the steel sheet.

(9) A manufacturing method of a hot-rolled steel sheet by sequentially performing rough hot rolling, finish hot rolling, primary cooling and secondary cooling on a slab including the chemical composition according to any one of (1) to (7), and coiling a resultant slab into the hot-rolled steel sheet, wherein:

the finish hot rolling is hot rolling in which with respect to a temperature T1 defined in a following expression (1), a maximum reduction ratio per pass in a first temperature region of (T1+30)° C. or higher and (T1+200)° C. or lower is 30% or more, a total reduction ratio in the first temperature region is 50% or more, a total reduction ratio in a second temperature region of T1° C. or higher and lower than (T1+30)° C. is 0 to 30%, and the rolling is completed in the first temperature region or the second temperature region;

the primary cooling is water cooling that satisfies a following expression (2) and achieves a cooling amount of 40° C. or higher and 140° C. or lower;

the secondary cooling is water cooling that is started within three seconds after the primary cooling and performs cooling at an average cooling rate of 30° C./sec or higher; and the coiling is to coil the slab at a temperature CT satisfying a following expression (3), $$T1(°\text{ C.})=850+10\times(C+N)\times Mn+350\times Nb+250\times Ti+40\times B+10\times Cr+100\times Mo+100\times V \quad (1)$$

$$1 \leq t/t1 \leq 2.5 \quad (2)$$

$$CT(°\text{ C.}) \leq \max[Ms, 350] \quad (3)$$

$$t1=0.001\times\{(Tf-T1)\times P1/100\}^2-0.109\times\{(Tf-T1)\times P1/100\}+3.1 \quad (4)$$

$$Ms(°\text{ C.})=561-474\times C-33\times Mn-17\times Ni-21\times Mo \quad (5)$$

where in the expression (1) and the expression (5), a symbol of each element is a content (mass %) of the element in the steel, in the expression (2), t is a time period (sec) from a final reduction in the reduction in one pass at 30% or more in the first temperature region to start of the primary cooling, and t1 is a time period (sec) decided by the above expression (4), in the expression (3), max[ ] is a function of returning a maximum value among arguments, and Ms is a temperature decided by the above expression (5), and in the expression (4), Tf and P1 are a steel sheet temperature and a reduction ratio (%) in the final reduction in the reduction in one pass at 30% or more in the first temperature region respectively.

(10) The manufacturing method of the hot-rolled steel sheet according to (9), wherein the rough hot rolling achieves a maximum reduction ratio per pass in a temperature region of 1000° C. or higher and 1200° C. or lower of 40% or more, and an austenite average grain diameter of 200 μm or less.

(11) The manufacturing method of the hot-rolled steel sheet according to (9) or (10), wherein a maximum heat generation due to plastic deformation in a temperature region of (T1+30)° C. or higher and (T1+150)° C. or lower of the finish hot rolling is 18° C. or lower.

(12) A manufacturing method of a hot-rolled steel sheet including: performing a plating treatment on the surface of the hot-rolled steel sheet obtained by the manufacturing method of the hot-rolled steel sheet according to any one of (9) to (11).

Effect of the Invention

According to the present invention, it is possible to provide a hot-rolled steel sheet, in particular, a high-strength steel sheet excellent in stretch flangeability and low-temperature toughness. Use of the steel sheet makes it possible to easily work the high-strength steel sheet and withstand use in severe cold districts, thereby providing significant industrial contribution.

MODE FOR CARRYING OUT THE INVENTION

Hereinafter, the content of the present invention will be explained in detail.

Including an texture in which, at a central portion of a sheet thickness that is a steel sheet portion sectioned at a ⅜ thickness position and a ⅝ thickness position of the sheet thickness from a surface of the steel sheet, an average value of X-ray random intensity ratios of a group of {100}<011> to {223}<110> orientations of a sheet plane is 6.5 or less and an X-ray random intensity ratio of a {332}<113> crystal orientation is 5.0 or less:

The definitions of the X-ray random intensity ratios are particularly important in the present invention.

The X-ray diffraction of the sheet plane is performed at the central portion of the sheet thickness that is the steel sheet portion sectioned at the ⅜ thickness position and the ⅝ thickness position of the sheet thickness from the surface of the steel sheet, and the average value of X-ray random intensity ratios of the group of the {100}<011> to {223}<110> orientations, when the intensity ratios of orientations of a standard sample (random sample) that has no specific crystal orientation but has random crystal orientations are obtained, is set to 6.5 or less, thereby making it possible to ensure excellent stretch flangeability satisfying a hole expansion ratio≥140% and a tensile strength×hole expansion ratio≥100000 MPa·% in a material of a strength of 590 MPa level, a hole expansion ratio≥90% and a tensile strength×hole expansion ratio≥70000 MPa·% in a material of a strength of 780 MPa level, and a hole expansion ratio≥40% and a tensile strength×hole expansion ratio≥50000 MPa·% in a material of a strength of 980 MPa level or more. Note that the average value of the X-ray random intensity ratios of the group of the {100}<011> to {223}<110> orientations of the sheet plane is preferably 4.0 or less.

When the average value of the X-ray random intensity ratios of the group of the {100}<011> to {223}<110> orientations is more than 6.5, the anisotropy of the mechanical properties of the steel sheet extremely increases, so that the stretch flangeability in a specific direction improves but the stretch flangeability in directions different therefrom significantly decreases, resulting in difficulty in obtaining mechanical properties satisfying the aforementioned hole expandability. On the other hand, when the average value of the X-ray random intensity ratios of the group of the {100}<011> to {223}<110> orientations of the sheet plane becomes less than 0.5, which is difficult to achieve in a current general continuous hot rolling process, deterioration of the hole expandability is concerned. Accordingly, it is preferable to set the average value of the X-ray random intensity ratios of the group of the {100}<011> to {223}<110> orientations of the sheet plane to 0.5 or more.

Here, the average value of the X-ray random intensity ratios of the group of the {100}<011> to {223}<110> orientations of the sheet plane is obtained by arithmetically averaging the X-ray random intensity ratios of {100}<011>, {116}<110>, {114}<110>, {113}<110>, {112}<110>, {335}<110>, and {223}<110> orientations.

The X-ray random intensity ratios of the orientations are measured using an apparatus for X-ray diffraction, EBSD (Electron Back Scattering Diffraction) or the like. It is only necessary to obtain from a three-dimensional texture calculated by a vector method on the basis of a {110}pole figure, or from a three-dimensional texture calculated by a series expansion method using a plurality (preferably three or more) of pole figures among {110}, {100}, {211}, {310}pole figures.

For example, for the X-ray random intensity ratio of each of the above-described crystal orientations in the latter method, each of intensities of (001)[1-1 0], (116)[1-1 0], (114)[1-1 0], (113)[1-1 0], (112)[1-1 0], (335)[1-1 0], (223) [1-1 0] at a φ2=45° cross-section in the three-dimensional texture may be used as it is. (1 with an upper bar indicating "minus 1" is expressed with "–1".)

As described above, the average value of the X-ray random intensity ratios of the group of the {100}<011> to {223}<110> orientations of the sheet plane means the arithmetic average of the X-ray random intensity ratios of the above-described orientations, and may be replaced with the arithmetic average of the X-ray random intensity ratios of the {100}<011>, {116}<110>, {114}<110>, {112}<110>, and {223}<110> orientations when it is impossible to obtain the X-ray random intensity ratios of all of the above-described orientations.

Further, for the same reason, when the X-ray random intensity ratio of the {332}<113> crystal orientation of the sheet plane is 5.0 or less (desirably 3.0 or less) at the central portion of the sheet thickness that is the steel sheet portion sectioned at the ⅜ thickness position and the ⅝ thickness position of the sheet thickness from the surface of the steel sheet, the tensile strength×hole expansion ratio≥50000 that is required to work an underbody part to be required immediately is satisfied. Further, the above-described X-ray random intensity ratio of the {332}<113> crystal orientation is preferable 3.0 or less.

When the above-described X-ray random intensity ratio of the {332}<113> crystal orientation is more than 5.0, the anisotropy of the mechanical properties of the steel sheet extremely increases, so that the stretch flangeability in a specific direction improves but the stretch flangeability in directions different therefrom significantly decreases to decrease the hole expansion ratio. On the other hand, when the above-described X-ray random intensity ratio of the {332}<113> crystal orientation becomes less than 0.5, which is difficult to achieve in the current general continuous hot rolling process, deterioration of the hole expandability is concerned. Accordingly, it is preferable to set the above-described X-ray random intensity ratio of the {332}<113> crystal orientation to 0.5 or more.

The reason why the above-described X-ray random intensity ratio of the crystal orientation is important for improving the hole expandability is not exactly clear but is presumed to be related to slip behavior of crystal in the hole expansion working.

With regard to the sample to be subjected to the X-ray diffraction, it is only necessary to reduce the steel sheet in thickness to a predetermined sheet thickness from the surface by mechanical polishing or the like, then remove its strain by chemical polishing, electrolytic polishing or the like, and at the same time, adjust the sample in accordance with the above-described method so that an appropriate plane in the range of ⅜ to ⅝ of the sheet thickness becomes a measuring plane, and then perform measurement.

As a matter of course, limitation of the above-described X-ray intensity is satisfied not only in the vicinity of ½ of the sheet thickness, but also in as many thicknesses as possible, whereby the hole expandability is further improved. However, the central portion of the sheet thickness that is the steel sheet portion sectioned at the ⅜ thickness position and the ⅝ thickness position of the sheet thickness from the surface of the steel sheet is measured to thereby make it possible to generally represent the material properties of the entire steel sheet, and is therefore defined.

Incidentally, a crystal orientation represented by {hkl}<uvw> means that the normal direction to the sheet plane is parallel to <hkl> and the rolling direction is parallel to <uvw>.

An r value (rC) in a direction perpendicular to the rolling direction is 0.70 or more, and an r value (r30) in a direction 30° from the rolling direction is 1.10 or less:

Satisfying the following mechanical properties in addition to the above-described texture makes it possible to ensure more excellent stretch flangeability. Accordingly, it is preferable to satisfy the following mechanical properties.

The r value (rC) in the direction perpendicular to the rolling direction:

The rC is preferably 0.70 or more. Note that the upper limit of the r value is not set in particular, but the rC set to 1.10 or less is preferable because more excellent hole expandability can be obtained.

The r value (r30) in the direction 30° from the rolling direction:

The r30 is preferably 1.10 or less. Note that the lower limit of the r value in the direction is not set in particular, but the r30 set to 0.70 or more is preferable because more excellent hole expandability can be obtained.

An r value (rL) in the rolling direction is 0.70 or more and an r value (r60) in a direction 60° from the rolling direction is 1.10 or less:

Satisfying the following mechanical properties in addition to the above-described texture makes it possible to ensure more excellent stretch flangeability. Accordingly, it is preferable to satisfy the following mechanical properties.

The r value (rL) in the rolling direction:

The rL is preferably 0.70 or more. Note that the upper limit of the rL value is not set in particular, but the rL set to 1.10 or less is preferable because more excellent hole expandability can be obtained.

The r value (r60) in the direction 60° from the rolling direction:

The r60 is preferably 1.10 or less. Note that the lower limit of the r60 value is not set in particular, but the r60 set to 0.70 or more is preferable because more excellent hole expandability can be obtained.

The above-described r values are each evaluated by a tensile test using a JIS No. 5 tensile test piece. Tensile strain only has to be evaluated usually in a range of 5 to 15% in the case of a high-strength steel sheet, and in a range of uniform elongation.

A microstructure of the steel sheet:

First, the average crystal grain diameter and the identification method of structure will be described.

In the present invention, average crystal grain diameter, ferrite, and retained austenite are defined using the EBSP-OIM (Electron Back Scatter Diffraction Pattern-Orientation Image Microscopy, trademark) method.

The EBSP-OIM method is constituted by a device and software of irradiating a highly inclined sample with electron beams in a scanning electron microscope (SEM), photographing a Kikuchi pattern formed by backscattering by a high-sensitive camera and subjecting it to computer image-processing to thereby measure a crystal orientation at the irradiation point within a short period of time. The EBSP method enables a quantitative analysis of a fine structure and a crystal orientation of a bulk sample surface, and can analyze them in an analysis area capable of being observed by the SEM with a resolution of 20 nm at a minimum though it depends on the resolution of the SEM. The analysis is performed for several hours by mapping an area to be analyzed for tens of thousands points in a grid state at regular intervals.

In addition to that the phase can be identified from the structure of the crystal orientation, it is possible to see the crystal orientation distribution and the size of the crystal grain within the sample in a polycrystalline material. It is possible to calculate a misorientation between adjacent measurement points from measurement information, and the average value thereof is called a KAM (Kernel Average Misorientation) value.

In the present invention, from an image obtained by mapping the misorientation of the crystal grain defined as 15° being a threshold value of a high-angle tilt grain boundary generally recognized as a crystal grain boundary, a grain is visualized to find an average crystal grain diameter. Further, a structure in which an average of the KAM value in a crystal grain surrounded by the high-angle tilt grain boundary of 15° is within 1° is defined as ferrite. This is because the ferrite is a high-temperature transformation phase and has small transformation strain. Further, a structure identified as austenite by the EBSP method is defined as retained austenite.

Tempered martensite or lower bainite defined in the present invention means a structure that transforms from the austenite at an Ms point or lower when the Ms point is higher than 350° C., or at 350° C. or lower when the Ms point is 350° C. or lower, and when the structure is observed under TEM, cementite or metastable iron carbide precipitates in a multi-variant state in the same lath.

On the other hand, a structure in which cementite or metastable iron carbide precipitates in a single-variant state in the same lath is defined as upper bainite. It is conceivable that this is because the driving force for precipitation of the cementite is lower than that of the tempered martensite or the lower bainite.

Similarly, a structure, in which precipitation of cementite or metastable iron carbide is not observed when the structure is observed under TEM, is defined as martensite.

Note that structural fraction of them is obtained by taking TEM photographs in 10 or more visual fields at 20000 magnifications and using the point counting method.

Though, in the high-strength steel sheet, a single-phase or dual-phase structure such as precipitation strengthened ferrite, bainite, martensite and the like is used to enhance its strength, the inventors found as a result of an earnest study that when the structure is made to have a total area ratio of the tempered martensite, martensite and lower bainite of or more than 85 area % and an average crystal grain diameter of 12.0 µm or less, more preferably, to have a hardness difference among the structures decreased to a certain level or less, the stress concentration on the structure interface is decreased to improve the stretch flangeability and the low-temperature toughness. A structure having a sum of fractions of the tempered martensite structure and the lower martensite of more than 85% has excellent balance between strength and elongation and is thus more preferable. When the average crystal grain diameter is more than 12.0 μm, it is difficult to ensure excellent low-temperature toughness satisfying vTrs≤−40° C.

Note that since there occurs no deterioration of the stretch flangeability or the low-temperature toughness even if these structures occupy 100% of the steel sheet, the upper limit of the structural fraction is not specified.

In the case of attaching importance to the improvement of ductility, the ferrite may be contained at less than 15% in area ratio.

As for the hardness difference among structures, assuming that an average value of the hardness when measuring the Vickers hardness at 100 points or more using a micro Vickers with a load of 0.098 N (10 gf) is E (HV0.01) and a standard deviation of the hardness is σ (HV0.01), it is preferable to set σ (HV0.01)/E (HV0.01) to 0.08 or less and contain the ferrite at 5 area % or more, because excellent mechanical properties can be obtained which achieve both the stretch flangeability and a total elongation satisfying a tensile strength×hole expansion ratio≥55000 MPa·%  and a tensile strength×total elongation≥14000 MPa·% and vTrs≤−40° C. at a tensile strength of 980 MPa level or more. Further, it is preferable to set the above σ (HV0.01)/E (HV0.01) to 0.06 or less because excellent mechanical properties can be obtained which achieve the stretch flangeability satisfying a tensile strength×hole expansion ratio≥60000 MPa·% and vTrs≤−40° C. at a tensile strength of 980 MPa level or more. Setting the above σ (HV0.01)/E (HV0.01) to 0.08 or less decreases the fact that the interface between the hard structure and the soft structure when observing the Charpy fracture surface is the starting point of a crack, which can be presumed to be a cause of the improvement of vTrs.

The lower limit of the σ (HV0.01)/E (HV0.01) is not set in particular, but is generally 0.03 or more.

A chemical composition of the steel sheet:

Next, the reason of limiting the chemical composition of the hot-rolled steel sheet in the present invention will be described. Note that "%" indicating the content means "mass %."

C: 0.01 to 0.2%

C (carbon) is an element having an action of improving the strength of the steel sheet. When the C content is less than 0.01%, it is difficult to obtain the effect by the above-described action. Accordingly, the C content is set to 0.01% or more. On the other hand, when the C content is more than 0.2%, a decrease of ductility is caused, and the iron-based carbide such as cementite ($Fe_3C$) to be the starting point of cracking in a secondary shear surface at the time of punching is increased to cause deterioration of the stretch flangeability. Therefore, the C content is set to 0.2% or less.

Si: 0.001% to 2.5%

Si (silicon) is an element having an action of improving the strength of the steel sheet and also performs a function as a deoxidizer of molten steel. When the Si content is less than 0.001%, it is difficult to obtain the effect by the above-described action. Therefore, the Si content is set to 0.001% or more. Further, Si also has an action of suppressing the precipitation of the iron-based carbide such as cementite and thereby improving the strength and the hole expandability. From this viewpoint, the Si content is set to 0.1% or more. On the other hand, even if the Si content is set to more than 2.5%, the effect by the action of increasing the strength of the steel sheet is saturated. Therefore, the Si content is set to 2.5% or less. Note that from the viewpoint of effectively improving the strength and the hole expandability by suppressing the precipitation of the iron-based carbide such as cementite, it is preferable to set the Si content to 1.2% or less.

Mn: 0.10 to 4.0%

Mn (manganese) has an action of improving the strength of the steel sheet by solid-solution strengthening and quench-hardening strengthening. When the Mn content is less than 0.10%, it is difficult to obtain the effect by the above-described action. Therefore, the Mn content is set to 0.10% or more. Further, Mn has an action of expanding the austenite region temperature to the low temperature side and thereby improving the hardenability to facilitate formation of a low-temperature transformation structure having an excellent burring property such as martensite or lower bainite. From this viewpoint, the Mn content is preferably set to 1% or more, and more preferably 2% or more. Further, Mn also has an action of suppressing occurrence of hot cracking caused by S. From this viewpoint, it is preferable to contain the Mn amount ensuring that the Mn content ([Mn]) and the S content ([S]) satisfy [Mn]/[S]≥20. On the other hand, even if the Mn content is set to more than 4.0%, the effect by the action of improving the strength of the steel sheet is saturated. Therefore, the Mn content is set to 4.0% or less.

P: 0.10% or less

P (phosphorus) is an element generally contained as an impurity. When the P content is more than 0.10%, P causes cracking in the hot rolling, and is segregated at a grain boundary to decrease the low-temperature toughness and also decrease the workability and the weldability. Therefore, the P content is set to 0.10% or less. From the viewpoint of the hole expandability and the weldability, the P content is preferably set to 0.02% or less.

S: 0.030% or less

S (sulfur) is an element generally contained as an impurity. When the S content is more than 0.030%, S causes cracking in the hot rolling, and generates an A-based inclusion in the steel to deteriorate the hole expandability. Therefore, the S content is set to 0.030% or less. From the viewpoint of the hole expandability, the S content is preferably set to 0.010% or less, and more preferably set to 0.005% or less.

Al: 0.001 to 2.0%

Al (aluminum) has an action of deoxidizing molten steel in a refining process of the steel to sound the steel. When the Al content is less than 0.001%, it is difficult to obtain the effect by the above-described action. Therefore, the Al content is set to 0.001% or more. Al further has, similarly to Si, an action of suppressing the precipitation of the iron-based carbide such as cementite and thereby improving the strength and hole expandability. From this viewpoint, the Al content is preferably set to 0.016% or more. On the other hand, even if the Al content is set to more than 2.0%, the effect by the deoxidation action is saturated, resulting in economic disadvantage. Further, Al may cause cracking in the hot rolling. Therefore, the Al content is set to 2.0% or less. From the viewpoint of suppressing generation of a non-metal inclusion in the steel to improve the ductility and the low-temperature toughness, the Al content is preferably set to 0.06% or less. the Al content is more preferably 0.04% or less.

N: 0.01% or less

N (nitrogen) is an element generally contained as an impurity. When the N content is more than 0.01%, N causes cracking in the hot rolling, and deteriorates the aging resistance. Therefore, the N content is set to 0.01% or less. From the viewpoint of the aging resistance, the N content is preferably 0.005% or less.

Ti: (0.005+48/14[N]+48/32[S]) %≤Ti≤0.3%:

Ti (titanium) is an element having an action of improving the strength of the steel sheet by precipitation strengthening or solid-solution strengthening. When the Ti content is less than (0.005+48/14[N]+48/32[S]) % that is decided by the N content [N](unit: %) and the S content [S](unit: %), it is difficult to obtain the effect by the above-described action. Therefore, the Ti content is set to (0.005+48/14[N]+48/32[S]) % or more. On the other hand, even if the Ti content is set to more than 0.3%, the effect by the above-described action is saturated, resulting in economic disadvantage. Therefore, the T1 content is set to 0.3% or less.

Nb, Cu, Ni, Mo, V, Cr:

Nb (niobium), Cu (copper), Ni (nickel), Mo (molybdenum), V (vanadium) and Cr (chromium) are elements each having an action of improving the strength of the steel sheet by solid-solution strengthening or quench-hardening strengthening. Therefore, one or two or more of the elements can be appropriately contained as necessary. However, even if the Nb content is set to more than 0.06%, the Cu content is set to more than 1.2%, the Ni content is set to more than 0.6%, the Mo content is set to more than 1%, the V content is set to more than 0.2%, and the Cr content is set to more than 2%, the effect by the above-described action is saturated, resulting in economic disadvantage. Therefore, the Nb content is set to 0 to 0.06%, the Cu content is set to 0 to 1.2%, the Ni content is set to 0 to 0.6%, the Mo content is set to 0 to 1%, the V content is set to 0 to 0.2%, and the Cr content is set to 0 to 2%. Note that to surely obtain the effect by the above-described action, it is preferable to satisfy any one of Nb: 0.005% or more, Cu: 0.02% or more, Ni: 0.01% or more, Mo: 0.01% or more, V: 0.01% or more, and Cr: 0.01% or more.

Mg, Ca, REM:

Mg (magnesium), Ca (calcium), and REM (rare-earth element) are elements each having an action of controlling the form of the non-metal inclusion being the starting point of fracture to cause deterioration of the workability and thereby improving the workability. Therefore, one or two or more of the elements may be appropriately contained as necessary. However, even if the Mg content is set to more than 0.01%, the Ca content is set to more than 0.01%, and the REM content is set to more than 0.1%, the effect by the above-described action is saturated, resulting in economic disadvantage. Therefore, the Mg content is set to 0 to 0.01%, the Ca content is set to 0 to 0.01%, and the REM content is set to 0 to 0.1%. Note that to surely obtain the effect by the above-described action, it is preferable to set the content of any one of the elements Mg, Ca and REM to 0.0005% or more.

B:

B (boron) is an element that is segregated at the grain boundary similarly to C and has an action of increasing the grain boundary strength. That is, B is segregated at the grain boundary as a solid-solution B similarly to the solid-solution C and thereby effectively acts to realize prevention of the fracture surface cracking. Further, even if C precipitates in the grain as carbide to decrease the solid-solution C at the grain boundary, B is segregated at the grain boundary and thereby can compensate for the decrease of C at the grain boundary. Therefore, B may be appropriately contained as necessary. However, when the B content is set to more than 0.002%, recrystallization of austenite in the hot rolling is excessively suppressed and a γ to α transformation texture from non-recrystallized austenite is strengthened to deteriorate the isotropy. Therefore, the B content is set to 0 to 0.002% or less. B is an element that may cause slab cracking in a cooling process after continuous casting and, from this viewpoint, is preferably set to 0.0015% or less. Note that to surely obtain the effect by the above-described action, the B content is preferably set to 0.0002% or more. Further, B also has an action of improving the hardenability, and facilitating formation of a continuous cooling transformation structure being a microstructure that is preferable for the burring property.

The balance is composed of iron (Fe) and impurities.

As the impurities, Zr, Sn, Co, Zn, W are contained in some cases, and there is no problem as long as the total of the contents of these elements is 1% or less.

Surface Treatment:

A plating layer intended to improve corrosion resistance and so on is provided on the surface of the above-described steel sheet to make a surface treated steel sheet. The plating layer may be an electroplating layer or a hot-dip plating layer. Examples of the electroplating layer include electrogalvanizing, Zn—Ni alloy electroplating and so on. Examples of the hot-dip plating layer include hot-dip galvanizing, alloying hot-dip galvanizing, hot-dip aluminum plating, hot-dip Zn—Al alloy plating, hot-dip Zn—Al—Mg alloy plating, hot-dip Zn—Al—Mg—Si alloy plating and so on. A plating adhesion amount is not limited in particular but may be similar to that in the prior art. Further, it is also possible to perform an appropriate conversion treatment (for example, application and drying of a silicate-based chromium-free conversion treatment liquid) after the plating to further increase the corrosion resistance. Further, it is also possible to perform organic coating forming, film laminating, and organic salts/inorganic salts treatments.

A Manufacturing Method of the Hot-Rolled Steel Sheet:

Next, the manufacturing method of the hot-rolled steel sheet of the present invention will be described.

To realize the excellent stretch flangeability and low-temperature toughness, it is important to form a predetermined texture and make a structure mainly containing the tempered martensite, martensite and lower bainite. Further, it is preferable that the hardness difference among structures is small and the r value in each direction satisfies a predetermined condition. The details of the manufacturing conditions for satisfying them will be listed below.

The manufacturing method prior to the hot rolling is not particularly limited. That is, it is only necessary to perform, subsequent to melting steel by a shaft furnace, an electric furnace or the like, various kinds of secondary refining to adjust the steel so as to have the above-described chemical composition, then cast it into a steel ingot or a slab by a method such as normal continuous casting, casting by an ingot method, other thin slab casting and so on. In the case of the continuous casting, the steel may be cooled once to a low temperature and then reheated and subjected to hot rolling, or a cast slab may be continuously hot-rolled. As a raw material, scraps may be used.

The high-strength steel sheet excellent in stretch flangeability and low-temperature brittleness of the present invention is obtained in the case of satisfying the following requirements.

In order to set, to the above-described value ranges, the average value of the X-ray random intensity ratios of the group of the {100}<011> to {223}<110> orientations of the sheet plane and the X-ray random intensity ratio of the {332}<113> crystal orientation, at the central portion of the sheet thickness located between the ⅝ and ⅜ thickness positions of the sheet thickness from the surface of the steel sheet, in finish rolling after rough rolling, on the basis of a T1 temperature decided from the following expression (1) from the steel sheet components, $$T1(°C.)=850+10\times(C+N)\times Mn+350\times Nb+250\times Ti+40\times B+10\times Cr+100\times Mo+100\times V \quad (1)$$

working by heavy reduction rolling is performed at a large reduction ratio in a first temperature region of (T1+30)° C. or higher and (T1+200)° C. or lower, then reduction is not performed or working by soft reduction rolling is performed at a small reduction ratio in a second temperature region of T1° C. or higher and lower than (T1+30)° C., and the rolling is completed in the first temperature region or the second temperature region, thereby ensuring local deformability of a final product.

That is, by the high reduction rolling in the first temperature region of (T1+30)° C. or higher and (T1+200)° C. or lower and the rolling completion in the first temperature region, or by the high reduction rolling in the first temperature region and the subsequent low reduction rolling in the second temperature region of T1 or higher and lower than (T1+30)° C. and the rolling completion in the second temperature region, the average value of the X-ray random intensity ratios of the group of the {100}<011> to {223}<110> orientations of the sheet plane and the X-ray random intensity ratio of the {332}<113> crystal orientation, at the central portion of the sheet thickness sectioned at the ⅝ thickness position and the ⅜ thickness position of the sheet thickness from the surface of the steel sheet can be controlled as are found in later-described Tables 2, 3, whereby the hole expandability of the final product is drastically improved.

The T1 temperature itself can be obtained by the empirical expression indicated in the above expression (1). The inventors experimentally found from experiments that the recrystallization in the austenite region of each steel is promoted on the basis of the T1 temperature.

To obtain more excellent hole expandability, it is important to accumulate strain by the heavy reduction in the first temperature region, and it is essential to set the maximum reduction ratio per pass in the first temperature region to 30% or more, in other words, perform reduction in one pass at a reduction ratio of 30% or more in the first temperature region at least one or more times and set the total of reduction ratios to 50% or more. Furthermore, it is more preferable to set the total of reduction ratios to 70% or more. On the other hand, setting the total of reduction ratios to more than 90% places a securement of temperature and a burden of excessive rolling, and therefore it is preferable to set the total of reduction ratios to 90% or less.

Further, to promote uniform crystallization by releasing the accumulated strain, it is necessary to suppress as much as possible the working amount in the second temperature region of T1° C. or higher and lower than (T1+30)° C., after the heavy reduction in the first temperature region of (T1+30)° C. or higher and (T1+200)° C. or lower, and the total of reduction ratios in the second temperature region of T1° C. or higher and lower than (T1+30)° C. is set to 0 to 30%. When the total of reduction ratios in the second temperature region is more than 30%, the finally crystallized austenite grain expands, and when the retention time period is short, recrystallization does not sufficiently proceed, resulting in deterioration of the hole expandability. Note that from the viewpoint of securing an excellent sheet shape, it is desirable to set the reduction ratio to 10% or more, but in the case of attaching more importance to the hole expandability, it is desirable to set the reduction ratio to 0%, namely, not to perform the low reduction rolling in the second temperature region.

As described above, the manufacturing method of the present invention is a method of controlling the texture of a product to improve its hole expandability by uniformly and finely recrystallizing the austenite in the finish rolling.

When the rolling is performed at a temperature lower than the second temperature region or the rolling at the large reduction ratio is performed in the second temperature region, the texture of the austenite grows to make it difficult to obtain the above-described predetermined texture in the finally obtained steel sheet. On the other hand, when the rolling is completed at a temperature higher than the first temperature region or the rolling at a small reduction ratio is performed in the first temperature region, coarsening and grain mixture become more likely to occur.

Note that as for whether the above-described defined rolling is performed or not, the reduction ratio can be obtained by actual results or calculation from the rolling load, sheet thickness measurement and the like, and the temperature can be actually measured when an inter-stand thermometer is installed or can be obtained by a calculation simulation in consideration of heat generation by working from the line speed or the reduction ratio or both of them.

The time period from final reduction in the reduction in one pass at 30% or more in the first temperature region to the start of primary cooling being water cooling greatly influences the stretch flangeability and the low-temperature toughness.

The time period t (sec) from the final reduction pass in one pass at 30% or more in the first temperature region to the start of the primary cooling is set to satisfy the following expression (2) with respect to a steel sheet temperature Tf (° C.) and a reduction ratio P1(%) in the final reduction in one pass at 30% or more in the first temperature region.

When t/t1 is less than 1, the recrystallization is suppressed to fail to obtain the predetermined texture, and when t/t1 is more than 2.5, coarsening proceeds to significantly decrease the elongation and the low-temperature brittleness.

$$1 \le t/t1 \le 2.5 \quad (2)$$

In the expression, t1 is the time period (sec) decided by the following expression (4).

$$t1=0.001\times\{(Tf-T1)\times P1/100\}^2-0.109\times\{(Tf-T1)\times P1/100\}+3.1 \quad (4)$$

A primary cooling amount that is the difference between the steel sheet temperature at the start of cooling in the primary cooling and the steel sheet temperature at the completion of the cooling (cooling temperature change) is set to 40° C. or higher and 140° C. or lower. When the primary cooling amount is lower than 40° C., it is difficult to suppress coarsening of the austenite grain, resulting in deterioration of the low-temperature toughness. On the other hand, when the primary cooling amount is more than 140° C., the recrystallization becomes insufficient to make it difficult to obtain the predetermined texture. Note that from the viewpoint of suppressing the coarsening of the austenite grain, it is preferable to set the average cooling rate in the primary cooling to 30° C./sec or higher. It is unnecessary to limit the upper limit of the average cooling rate in the primary cooling in particular, but it is preferable to set the average cooling rate to 2000° C./sec or lower.

Cooling is started within three seconds after the primary cooling is performed, to perform secondary cooling of water-cooling at an average cooling rate of 30° C./sec or higher. Here, the secondary cooling means water-cooling performed from the start of the secondary cooling until the start of coiling, and the average cooling rate of the secondary cooling is the average cooling rate in the water cooling and is calculated excluding the period of suspending the water cooling in the case of suspending the water cooling at the middle of the secondary cooling as described later.

From the completion of the primary cooling until the start of the secondary cooling, the steel sheet is kept in the high temperature region because the water cooling is not performed. If the secondary cooling is started after more than three seconds after the primary cooling is performed or if the secondary cooling is performed at an average cooling rate lower than 30° C./sec within three seconds after the primary cooling is performed, the structural fraction of the high-temperature transformation phase such as ferrite, pearlite, upper bainite becomes more than 15% during the secondary cooling from the completion of the finish rolling until the start of coiling to fail to obtain the desired structural fraction and the hardness difference among structures, resulting in deterioration of the low-temperature toughness in particular. The upper limit of the average cooling rate in the secondary cooling is not particularly set, but a rate of 300° C./sec or lower is the adequate average cooling rate in terms of ability of the cooling facility.

In the case of attaching the importance to the improvement of ductility and thus containing ferrite at 15% or less in area ratio, the water cooling may be suspended in a range of 15 seconds or less in a temperature region from 500° C. to 800° C. (two-phase region of ferrite and austenite) at the middle of the second cooling.

Here, the suspension of the water cooling is performed to proceed the ferrite transformation in the two-phase region. When the suspension time of the water cooling is more than 15 seconds, the ferrite area ratio becomes more than 15% to increase the hardness difference among structures, resulting in deterioration of the stretch flangeability and the low-temperature toughness in some cases. Therefore, in the case of suspending the water cooling at the middle of the secondary cooling, it is desirable to set the time period to 15 seconds or less. Further, it is desirable to set the temperature region where the water cooling is suspended to 500° C. or higher and 800° C. or lower to easily proceed the ferrite transformation, and set the time period when the water cooling is suspended to 1 second or more. Note that from the viewpoint of productivity, it is more desirable to set the time period for suspending the water cooling to 10 seconds or less.

After the above-described secondary cooling is performed, coiling is performed at a coiling temperature CT (° C.) satisfying the following expression (3). When the steel sheet is coiled at a temperature higher than the right side in the following expression (3), the structural fraction of the high-temperature transformation phase such as ferrite, pearlite, upper bainite becomes 15% or more to fail to obtain the desired structural fraction and hardness difference among structures, resulting in deterioration of the stretch flangeability and the low-temperature toughness. It is desirable to coil the steel sheet at a temperature lower than 300° C. in the case of satisfying vTrs≤−40, and achieving a hole expansion ratio≥140% and a tensile strength×hole expansion ratio 100000 MPa·% in a material of a strength of 590 MPa level, achieving a hole expansion ratio 90% and a tensile strength×hole expansion ratio≥70000 MPa·% in a material of a strength of 780 MPa level, and achieving a hole expansion ratio≥40% and a tensile strength×hole expansion ratio≥50000 MPa·% in a material of a strength of 980 MPa level or more.

$$CT(° C.) \leq \max[Ms, 350] \quad (3)$$

In the expression, Ms is decided from the following expression (5), and the symbol of each element in the following expression (5) indicates the content (mass %) of the element in the steel.

$$Ms(° C.) = 561 - 474 \times C - 33 \times Mn - 17 \times Ni - 21 \times Mo \quad (5)$$

Note that to satisfy the above-described suitable values of rC, r30, the austenite grain diameter after the rough hot rolling, namely, before the finish hot rolling is important, and the austenite grain diameter before the finish hot rolling is desirably small. Concretely, by setting the average grain diameter (circle-equivalent average diameter) of the austenite to 200 μm or less, the above-described suitable values can be obtained.

Then, to set the austenite average grain diameter to 200 μm or less before the finish hot rolling, it is only necessary to set the maximum reduction ratio per pass in a temperature region of 1000° C. or higher and 1200° C. or lower in the rough hot rolling to 40% or more, in other words, to perform the reduction in one pass at a reduction ratio of 40% or more at least one or more times.

Therefore, the rough hot rolling preferably achieves a maximum reduction ratio per pass in the temperature region of 1000° C. or higher and 1200° C. or lower of 40% or more, and an austenite average grain diameter of 200 μm or less.

Note that as the reduction ratio is larger or the number of times of reduction is larger, the austenite grain can be made finer. Further, it is preferable to set the austenite average grain diameter to 100 μm or lower, and to this end, it is desirable to perform the reduction in one pass at a reduction ratio of 40% or more two or more times. However, the rough hot rolling more than 10 passes may decrease the temperature and excessively generate scale, and the reduction in one pass at a reduction ratio more than 70% may draw the inclusion to cause deterioration of the hole expandability. Therefore, it is desirable to perform the reduction in one pass at a reduction ratio of 40% or more 10 passes or less, and set the maximum reduction ratio to 70% or less.

By making the austenite grain diameter before the finish hot rolling smaller, the recrystallization of austenite in the finish hot rolling process is promoted to realize the improvement of the hole expandability achieved by setting the rC value and the r30 value to the suitable values. It is presumed that the austenite grain boundary after the rough hot rolling (namely, before the finish hot rolling) functions as one recrystallization nucleus in the finish hot rolling.

Here, the confirmation of the austenite grain diameter after the rough hot rolling is performed by cooling as quickly as possible a sheet piece before it is subjected to the finish hot-rolling, concretely, by cooling the sheet piece at a cooling rate of 10° C./sec or higher, then etching the structure in the cross section of the sheet piece to expose the austenite grain boundary, and then performing measurement with an optical microscope. In this event, the measurement is performed in 20 or more visual fields at 50 or more magnifications by the image analysis or the point counting method.

Further, to satisfy the above-described suitable ranges for the rL in the rolling direction and for the r60 in the direction 60° from the rolling direction, it is desirable to suppress the maximum heat generation due to plastic deformation in a temperature region of (T1+30)° C. or higher and (T1+150)°

C. or lower being the first temperature region, namely, a temperature increased margin (° C.) of the steel sheet by reduction to 18° C. or lower. To suppress the maximum heat generation due to plastic deformation as described above, it is desirable to use inter-stand cooling.

Note that for the purpose of improving the ductility by correction of the steel sheet shape or introduction of mobile dislocation, it is desirable to perform skin pass rolling being soft reduction at a reduction ratio of 0.1% or more and 2% or less after the completion of all of processes. Further, after the completion of all of processes, for the purpose of removing the scale adhering to the surface of the obtained hot-rolled steel sheet, pickling may be performed for the obtained hot-rolled steel sheet as necessary. After performing the pickling, skin pass or cold rolling at a reduction ratio of 10% or less may be performed inline or offline for the obtained hot-rolled steel sheet.

Furthermore, a plating layer may be provided on the surface of the steel sheet as necessary to make a surface treated steel sheet. The plating layer may be an electroplating layer or a hot-dip plating layer, and the treatment method may be realized by a normal method.

EXAMPLES

Next, the technical content of the present invention will be explained taking examples of the present invention.

The examples were studied using adaptable steels satisfying claims of the present invention being steels A to P and comparative steels being steels a to e, which have chemical compositions listed in Table 1.

These steels were kept as they were or once cooled to room temperature after casting, then reheated to a temperature range of 900° C. to 1300° C., then subjected to the hot rolling under the conditions listed in Table 2-1 and Table 2-2, cooled under the conditions listed in Table 2-1 and Table 2-2 to form hot-rolled steel sheets with a thickness of 2.3 to 3.4 mm. Thus obtained hot-rolled steel sheets were subjected to pickling, then subjected to skin pass rolling at a reduction ratio of 0.5%, subjected to hot-dip galvanizing treatment and further alloying treatment with part of them, and provided for material quality evaluation. Note that alphabet characters attached to the heads of test numbers in Table 2-1, Table 2-2, Table 3-1 and Table 3-2 indicate the steel types in Table 1.

The chemical components in each steel are listed in Table 1, and manufacturing conditions for each hot-rolled steel sheet are listed in Table 2-1 and Table 2-2. Further, the steel structure, grain diameter and mechanical properties (r value in each direction, tensile strength TS, elongation EL, hole expansion ratio λ, brittleness ductility transition temperature vTrs) of each hot-rolled steel sheet are listed in Table 3-1 and Table 3-2.

Note that the tensile test conformed to JIS Z 2241, and the hole expansion test conformed to The Japan Iron and Steel Federation Standard JFS T1001. The X-ray random intensity ratio was measured at a pitch of 0.5 μm at the central portion of the sheet thickness between the ⅜ to ⅝ thickness positions of the sheet thickness from the surface of the steel sheet in the cross sections parallel to the rolling direction and the sheet thickness direction using the above-described EBSD. Further, the r value in each direction was measured by the above-described method. The Vickers hardness was measured at a load of 0.098 N (10 gf) using the micro Vickers tester. The Charpy test was performed conforming to JIS Z 2242 with the steel sheet processed into a 2.5 mm sub-size test piece.

From the evaluation results indicated in Table 3-1 and Table 3-2, only the steel sheets satisfying the conditions defined in the present invention have excellent stretch flangeability and low-temperature toughness.

TABLE 1

| | CHEMICAL COMPOSITION (MASS (%), BALANCE: Fe AND IMPURITIES) | | | | | | | | | | | | |
|---|---|---|---|---|---|---|---|---|---|---|---|---|---|
| STEEL | C | Si | Mn | P | S | Al | N | Ti | Nb | Cu | Ni | Mo | V |
| A | 0.019 | 0.32 | 0.98 | 0.015 | 0.0021 | 0.022 | 0.0027 | 0.110 | 0.010 | — | — | — | — |
| B | 0.020 | 0.27 | 1.01 | 0.012 | 0.0026 | 0.031 | 0.0022 | 0.050 | 0.053 | — | — | — | 0.11 |
| C | 0.060 | 0.18 | 1.99 | 0.013 | 0.0014 | 0.017 | 0.0025 | 0.095 | 0.041 | — | — | — | — |
| D | 0.057 | 0.22 | 2.04 | 0.011 | 0.0045 | 0.220 | 0.0030 | 0.040 | 0.035 | — | 0.04 | — | — |
| E | 0.043 | 1.10 | 1.29 | 0.007 | 0.0030 | 0.044 | 0.0033 | 0.121 | 0.018 | — | — | — | — |
| F | 0.039 | 1.22 | 1.10 | 0.010 | 0.0021 | 0.015 | 0.0040 | 0.100 | 0.050 | 0.06 | — | — | — |
| G | 0.063 | 1.21 | 2.55 | 0.012 | 0.0033 | 0.022 | 0.0031 | 0.142 | 0.021 | — | — | — | — |
| H | 0.059 | 1.24 | 2.49 | 0.011 | 0.0023 | 0.024 | 0.0028 | 0.030 | 0.010 | — | — | 0.61 | — |
| I | 0.064 | 1.23 | 2.48 | 0.013 | 0.0040 | 0.030 | 0.0027 | 0.191 | 0.013 | — | — | — | — |
| J | 0.061 | 1.18 | 2.35 | 0.054 | 0.0032 | 0.040 | 0.0040 | 0.050 | 0.021 | — | — | — | — |
| K | 0.055 | 1.22 | 2.52 | 0.011 | 0.0041 | 0.025 | 0.0020 | 0.110 | 0.020 | — | — | — | — |
| L | 0.054 | 1.26 | 2.45 | 0.013 | 0.0038 | 0.031 | 0.0040 | 0.240 | 0.010 | — | — | — | — |
| M | 0.142 | 1.51 | 2.71 | 0.020 | 0.0016 | 0.033 | 0.0031 | 0.020 | 0.022 | — | — | — | — |
| N | 0.138 | 0.80 | 2.28 | 0.012 | 0.0038 | 0.024 | 0.0040 | 0.031 | 0.014 | — | — | — | — |
| O | 0.065 | 1.21 | 2.53 | 0.011 | 0.0035 | 0.031 | 0.0030 | 0.021 | — | — | — | — | — |
| P | 0.190 | 1.51 | 3.20 | 0.02 | 0.0016 | 0.035 | 0.0051 | 0.031 | 0.020 | — | 0.55 | 0.97 | — |
| a | 0.250 | 2.13 | 3.44 | 0.012 | 0.0010 | 0.038 | 0.0028 | 0.050 | 0.005 | — | — | — | — |
| b | 0.059 | 1.15 | 2.38 | 0.120 | 0.0040 | 0.025 | 0.0044 | 0.010 | 0.030 | — | — | — | — |
| c | 0.031 | 1.31 | 2.30 | 0.021 | 0.0310 | 0.027 | 0.0035 | 0.180 | 0.031 | — | — | — | — |
| d | 0.058 | 1.24 | 2.60 | 0.015 | 0.0040 | 2.530 | 0.0036 | 0.054 | 0.020 | — | — | — | — |
| e | 0.138 | 0.81 | 2.31 | 0.011 | 0.0040 | 0.025 | 0.0150 | 0.010 | 0.005 | — | — | — | — |
| f | 0.065 | 1.21 | 2.53 | 0.011 | 0.035 | 0.031 | 0.0030 | 0.021 | — | — | — | — | — |

TABLE 1-continued

| | CHEMICAL COMPOSITION (MASS (%), BALANCE: Fe AND IMPURITIES) | | | | | | | |
|---|---|---|---|---|---|---|---|---|
| STEEL | Cr | Mg | Ca | REM | B | TOTAL AMOUNT OF Zr, Sn, Co, Zn, W | 0.005 + 48/14[N] + 48/32[S] | REMARKS |
| A | — | — | — | — | — | 0.01 | 0.0174 | ADAPTABLE STEEL |
| B | — | — | — | — | — | 0.02 | 0.0164 | |
| C | — | — | — | — | — | 0.01 | 0.0157 | |
| D | — | 0.0022 | — | — | — | 0.02 | 0.0220 | |
| E | — | — | — | — | — | 0.01 | 0.0208 | |
| F | 0.01 | — | 0.0018 | — | — | 0.03 | 0.0219 | |
| G | — | — | — | — | — | 0.01 | 0.0206 | |
| H | — | — | — | 0.0016 | — | 0.01 | 0.0181 | |
| I | — | — | — | — | 0.0005 | 0.02 | 0.0203 | |
| J | — | — | — | — | — | 0.02 | 0.0235 | |
| K | — | — | — | — | — | 0.01 | 0.0180 | |
| L | — | 0.0020 | — | 0.0010 | — | 0.01 | 0.0244 | |
| M | — | — | — | — | — | 0.01 | 0.0180 | |
| N | — | — | 0.0015 | — | — | 0.20 | 0.0244 | |
| O | — | — | — | — | — | 0.01 | 0.0205 | |
| P | — | — | — | — | — | 0.02 | 0.0249 | |
| a | — | — | — | — | — | 0.01 | 0.0161 | COMPARATIVE STEEL |
| b | — | — | — | — | — | 0.03 | <u>0.0261</u> | |
| c | — | — | — | — | — | 0.02 | <u>0.0635</u> | |
| d | — | — | — | — | — | 0.01 | 0.0233 | |
| e | — | — | — | — | — | 0.18 | <u>0.0624</u> | |
| f | — | — | — | — | — | 0.18 | <u>0.0678</u> | |

(NOTE)
UNDERLINE OF NUMERICAL VALUE IN TABLE INDICATES THAT IT IS OUTSIDE APPROPRIATE RANGE OF PRESENT INVENTION

TABLE 2-1

| | ROUGH HOT ROLLING | | AUSTENITE GRAIN DIAMETER AFTER ROUGH ROLLING (μm) | FINISH HOT ROLLING | | | | | | | | |
|---|---|---|---|---|---|---|---|---|---|---|---|---|
| | | | | FIRST TEMPERATURE REGION | | | | | | SECOND TEMPERATURE REGION T1°C. OR HIGHER AND LOWER THAN (T1 + 30)° C. TOTAL REDUCTION RATIO (%) | FINAL ROLLING TEMPERATURE (° C.) | PRIMARY COOLING | |
| | REDUCTION IN ONE PASS AT 40% OR MORE IN TEMPERATURE REGION OF 1000° C. OR HIGHER AND 1200° C. OR LOWER | | | | REDUCTION IN ONE PASS AT 30% OR MORE AT (T1 + 30)° C. OR HIGHER AND (T1 + 200)° C. OR LOWER | | | REDUCTION IN ONE PASS AT 30% OR MORE AT (T1 + 30)° C. OR HIGHER AND (T1 + 150)° C. OR LOWER MAXIMUM HEAT GENERATION DUE TO PLASTIC DEFORMATION (° C.) | | | | | |
| TEST NUMBER | NUMBER OF TIMES (TIME) | REDUCTION RATIO IN EACH PASS (%) | | MAXIMUM REDUCTION RATIO (%) | TOTAL REDUCTION RATIO (%) | FINAL REDUCTION TEMPERATURE Tf (° C.) | FINAL REDUCTION RATIO P1 (%) | | | | | t1*1 (sec) | t*2 (sec) |
| A1 | 2 | 40/40 | 96 | 48 | 88 | 1042 | 40 | 6 | 0 | 1042 | 0.23 | 0.35 |
| A2 | 3 | 40/40/45 | 67 | 48 | 88 | 1041 | 40 | 8 | 0 | 1041 | 0.22 | 0.35 |
| A3 | 2 | 40/40 | 89 | 48 | 88 | 1000 | 40 | 10 | 0 | 1000 | 0.18 | 0.35 |
| B1 | 1 | 40 | 143 | 48 | 88 | 1060 | 40 | 12 | 0 | 1060 | 0.29 | 0.35 |
| C1 | 2 | 40/40 | 79 | 48 | 88 | 1052 | 41 | 12 | 0 | 1052 | 0.28 | 0.31 |
| D1 | 1 | 40 | 142 | 48 | 88 | 1012 | 40 | 10 | 0 | 1012 | 0.13 | 0.30 |
| E1 | 3 | 40/40/45 | 55 | 48 | 88 | 1049 | 41 | 10 | 0 | 1049 | 0.27 | 0.30 |
| E2 | 3 | 40/40/45 | 58 | 48 | 88 | 1034 | 41 | 4 | 0 | 1034 | 0.16 | 0.30 |
| E3 | 2 | 40/40 | 86 | 48 | 88 | 1004 | 41 | 8 | 0 | 1004 | 0.17 | 0.30 |
| E4 | 1 | 40 | 183 | 47 | 88 | 990 | 40 | 12 | 0 | 997 | 0.24 | 0.30 |
| E6 | 2 | 40/40 | 83 | 48 | 88 | 973 | 35 | 13 | 5 | 973 | 0.73 | 0.30 |
| F1 | 2 | 40/40 | 80 | 48 | 88 | 1051 | 35 | 10 | 0 | 1051 | 0.20 | 0.30 |
| F2 | 2 | 40/40 | 76 | 40 | 40 | 1067 | 40 | 5 | 0 | 1067 | 0.70 | 0.30 |
| G1 | 2 | 40/40 | 95 | 48 | 88 | 1053 | 40 | 7 | 0 | 1053 | 0.21 | 0.34 |
| G2 | 2 | 40/40 | 87 | 48 | 88 | 1024 | 36 | 12 | 0 | 1024 | 0.19 | 0.34 |
| H1 | 3 | 40/40/45 | 41 | 48 | 88 | 1028 | 41 | 13 | 0 | 1028 | 0.19 | 0.46 |
| H2 | 2 | 40/40 | 94 | 45 | 45 | 1029 | 41 | 12 | 0 | 1029 | 0.18 | 0.34 |
| I1 | 2 | 40/40 | 84 | 47 | 88 | 1034 | 40 | 10 | 0 | 1034 | 0.14 | 0.34 |
| I2 | 2 | 40/40 | 85 | 51 | 88 | 1068 | 42 | 13 | 0 | 1068 | 0.34 | 0.34 |
| I3 | 2 | 40/40 | 78 | 48 | 88 | 1031 | 35 | 16 | 0 | 1031 | 0.23 | 0.34 |
| J1 | 2 | 40/40 | 97 | 48 | 88 | 987 | 40 | 20 | 0 | 987 | 0.14 | 0.34 |
| J2 | 2 | 40/40 | 96 | 47 | 87 | 1000 | 41 | 12 | 0 | 1000 | 0.14 | 0.34 |
| J3 | 3 | 40/40/45 | 49 | 48 | 88 | 1037 | 35 | 8 | 0 | 1037 | 0.19 | 0.34 |

TABLE 2-1-continued

| TEST NUMBER | PRIMARY COOLING | | SECONDARY COOLING | | | COOLING AFTER SECONDARY COOLING TO COILING | | COILING TEMPERATURE (° C.) | PLATING | | T1 (° C.) | Ms POINT (° C.) | REMARKS |
|---|---|---|---|---|---|---|---|---|---|---|---|---|---|
| | t/t1 | PRIMARY COOLING AMOUNT (° C.) | RETENTION TIME PERIOD FROM COMPLETION OF PRIMARY COOLING TO START OF SECONDARY COOLING (sec) | AVERAGE COOLING RATE (° C./s) | | AIR COOLING TIME PERIOD (sec) | AIR COOLING START TEMPERATURE (° C.) | | PRESENCE/ ABSENCE OF PLATING | PRESENCE/ ABSENCE OF ALLOYING | | | |
| A1 | 1.54 | 84 | 2.5 | 86 | | 0 | — | 261 | ABSENCE | ABSENCE | 881 | 520 | INVENTION EXAMPLE |
| A2 | 1.59 | 76 | 2.5 | 70 | | 9 | 720 | 42 | ABSENCE | ABSENCE | 881 | 520 | INVENTION EXAMPLE |
| A3 | 1.97 | 107 | 2.5 | 94 | | 0 | — | 476 | ABSENCE | ABSENCE | 881 | 520 | INVENTION EXAMPLE |
| B1 | 1.20 | 110 | 2.5 | 100 | | 0 | — | 319 | PRESENCE | PRESENCE | 892 | 518 | INVENTION EXAMPLE |
| C1 | 1.10 | 94 | 1.4 | 94 | | 5 | 710 | 251 | ABSENCE | ABSENCE | 889 | 467 | INVENTION EXAMPLE |
| D1 | 2.29 | 76 | 1.8 | 113 | | 0 | — | 413 | PRESENCE | PRESENCE | 873 | 466 | INVENTION EXAMPLE |
| E1 | 1.10 | 106 | 1.4 | 86 | | 0 | — | 234 | ABSENCE | ABSENCE | 887 | 498 | INVENTION EXAMPLE |
| E2 | 1.84 | 94 | 1.4 | 71 | | 8 | 720 | 387 | ABSENCE | ABSENCE | 887 | 498 | INVENTION EXAMPLE |
| E3 | 1.74 | 87 | 1.4 | 102 | | 0 | — | 456 | ABSENCE | ABSENCE | 887 | 498 | INVENTION EXAMPLE |
| E4 | 1.25 | 76 | 1.4 | 106 | | 0 | — | 84 | PRESENCE | PRESENCE | 887 | 498 | INVENTION EXAMPLE |
| E6 | 0.41 | 120 | 1.8 | 96 | | 0 | — | 180 | ABSENCE | ABSENCE | 887 | 498 | COMPARATIVE EXAMPLE |
| F1 | 1.49 | 76 | 1.4 | 76 | | 0 | — | 351 | ABSENCE | ABSENCE | 871 | 506 | INVENTION EXAMPLE |
| F2 | 0.43 | 89 | 1.4 | 88 | | 0 | — | 24 | ABSENCE | ABSENCE | 871 | 506 | COMPARATIVE EXAMPLE |
| G1 | 1.65 | 132 | 1.3 | 27 | | 0 | — | 402 | ABSENCE | ABSENCE | 895 | 447 | COMPARATIVE EXAMPLE |
| G2 | 1.75 | 104 | 1.5 | 46 | | 0 | — | 109 | PRESENCE | PRESENCE | 895 | 447 | INVENTION EXAMPLE |
| H1 | 1.79 | 120 | 1.2 | 101 | | 0 | — | 204 | ABSENCE | ABSENCE | 914 | 440 | INVENTION EXAMPLE |
| H2 | 2.50 | 101 | 1.2 | 98 | | 0 | — | 246 | ABSENCE | ABSENCE | 914 | 440 | COMPARATIVE EXAMPLE |
| I1 | 2.50 | 104 | 1.3 | 102 | | 0 | — | 401 | ABSENCE | ABSENCE | 904 | 449 | INVENTION EXAMPLE |

TABLE 2-1-continued

| | | | | | | | | | | | |
|---|---|---|---|---|---|---|---|---|---|---|---|
| I2 | 1.01 | 80 | 89 | 0 | — | 98 | ABSENCE | ABSENCE | 904 | 449 | INVENTION EXAMPLE |
| I3 | 1.47 | 87 | 60 | 11.5 | 690 | 264 | ABSENCE | ABSENCE | 904 | 449 | INVENTION EXAMPLE |
| J1 | 2.37 | 76 | 76 | 0 | — | 187 | ABSENCE | ABSENCE | 860 | 455 | INVENTION EXAMPLE |
| J2 | 2.46 | <u>35</u> | 85 | 0 | — | 367 | ABSENCE | ABSENCE | 860 | 455 | COMPARATIVE EXAMPLE |
| J3 | 1.84 | 84 | 94 | 0 | — | 129 | ABSENCE | ABSENCE | 860 | 455 | INVENTION EXAMPLE |

(NOTE)
*[1] $t1 = 0.001((Tf - T1) \times P1/100)^2 - 0.109((Tf - T1) \times P1/100) + 3.1$
*[2] $t1 \leq t \leq t1 \times 2.5$ NOTE
THAT UNDERLINE OF NUMERICAL VALUE IN TABLE INDICATES THAT IT IS OUTSIDE APPROPRIATE RANGE OF PRESENT INVENTION

TABLE 2-2

| | ROUGH HOT ROLLING | | | FINISH HOT ROLLING | | | | | | | |
|---|---|---|---|---|---|---|---|---|---|---|---|
| | | | AUSTENITE GRAIN DIAMETER AFTER ROUGH ROLLING (μm) | FIRST TEMPERATURE REGION | | | | | SECOND TEMPERATURE REGION T1° C. OR HIGHER AND LOWER THAN (T1 + 30)° C. TOTAL REDUCTION RATIO (%) | PRIMARY COOLING | |
| | REDUCTION IN ONE PASS AT 40% OR MORE IN TEMPERATURE REGION OF 1000° C. OR HIGHER AND 1200° C. OR LOWER | | | REDUCTION IN ONE PASS AT 30% OR MORE AT (T1 + 30)° C. OR HIGHER AND (T1 + 200)° C. OR LOWER | | | | REDUCTION IN ONE PASS AT 30% OR MORE AT (T1 + 30)° C. OR HIGHER AND (T1 + 150)° C. OR LOWER MAXIMUM HEAT GENERATION DUE TO PLASTIC DEFORMATION IN REDUCTION (° C.) | | | | |
| TEST NUMBER | NUMBER OF TIMES (TIME) | REDUCTION RATIO IN EACH PASS (%) | | MAXIMUM REDUCTION RATIO (%) | TOTAL REDUCTION RATIO (%) | FINAL REDUCTION TEMPERATURE Tf (° C.) | FINAL REDUCTION RATIO P1 (%) | | FINAL ROLLING TEMPERATURE (° C.) | | t1*1 (sec) | t*2 (sec) |
| K1 | 3 | 40/40/45 | 53 | 52 | 85 | 1031 | 42 | 13 | 1031 | 0 | 0.17 | 0.34 |
| K2 | 3 | 40/40/45 | 58 | 56 | 88 | 1048 | 41 | 15 | 1031 | 5 | 0.27 | 0.34 |
| K3 | 2 | 40/40 | 86 | 48 | 88 | 1020 | 42 | 8 | 1020 | 0 | 0.13 | 0.30 |
| K4 | 1 | 45 | 139 | 47 | 88 | 1021 | 40 | 10 | 1021 | 0 | 0.13 | 0.30 |
| K5 | 0 | — | 211 | 48 | 88 | 1026 | 40 | 11 | 1026 | 0 | 0.13 | 0.30 |
| K6 | 2 | 40/40 | 91 | 27 | 88 | 1103 | — | 4 | 1001 | 0 | 1.17 | 12.40 |
| K7 | 2 | 40/40 | 95 | 41 | 41 | 1026 | 41 | 6 | 1026 | 0 | 0.14 | 0.30 |
| K8 | 2 | 40/40 | 84 | 41 | 68 | 1006 | 41 | 9 | 1006 | 0 | 0.16 | 0.30 |
| K9 | 2 | 40/40 | 90 | 41 | 88 | 1031 | 35 | 19 | 1031 | 0 | 0.14 | 0.30 |
| K10 | 2 | 40/40 | 87 | 48 | 88 | 951 | 35 | 15 | 951 | 0 | 1.14 | 0.45 |
| K11 | 2 | 40/40 | 76 | 48 | 88 | 1019 | 40 | 11 | 1019 | 0 | 0.13 | 0.34 |
| K12 | 2 | 40/40 | 83 | 48 | 88 | 1015 | 41 | 9 | 1015 | 0 | 0.13 | 0.30 |
| K13 | 2 | 40/40 | 78 | 48 | 88 | 999 | 40 | 11 | 999 | 0 | 0.22 | 0.30 |
| K14 | 2 | 40/40 | 69 | 48 | 88 | 1007 | 40 | 13 | 1007 | 0 | 0.17 | 0.30 |
| K15 | 2 | 40/40 | 81 | 48 | 88 | 1010 | 40 | 12 | 1010 | 0 | 0.15 | 0.30 |
| K16 | 2 | 40/40 | 87 | 48 | 88 | 1035 | 41 | 14 | 1030 | 5 | 0.17 | 0.34 |
| K17 | 1 | 40 | 157 | 52 | 88 | 1027 | 40 | 11 | 1027 | 0 | 0.13 | 0.30 |
| K18 | 2 | 40/40 | 86 | 48 | 88 | 1004 | 41 | 15 | 1004 | 0 | 0.17 | 0.34 |
| K19 | 2 | 40/40 | 81 | 48 | 88 | 1016 | 31 | 12 | 1016 | 0 | 0.33 | 0.34 |
| L1 | 2 | 40/40 | 75 | 48 | 88 | 1072 | 30 | 15 | 1072 | 0 | 0.18 | 0.28 |
| L2 | 3 | 40/40/45 | 52 | 48 | 88 | 1048 | 41 | 11 | 1040 | 5 | 0.13 | 0.29 |
| L3 | 2 | 40/40 | 80 | 48 | 85 | 945 | 30 | 6 | 940 | 32 | 0.13 | 0.30 |
| L4 | 2 | 40/40 | 76 | 48 | 88 | 1055 | 41 | 12 | 1055 | 0 | 0.14 | 0.34 |
| M1 | 3 | 40/40/45 | 39 | 48 | 88 | 1019 | 41 | 12 | 1019 | 0 | 0.19 | 0.45 |
| M2 | 3 | 40/40/45 | 42 | 48 | 88 | 1023 | 41 | 10 | 1006 | 0 | 0.22 | 0.45 |
| M3 | 1 | 45 | 104 | 48 | 88 | 1038 | 41 | 12 | 1011 | 0 | 0.37 | 0.45 |

TABLE 2-2-continued

| | | | | | | | | | | | |
|---|---|---|---|---|---|---|---|---|---|---|---|
| M4 | 2 | 40/45 | 66 | 48 | 88 | 0 | 978 | 8 | 0 | 35 | 0.37 | 0.45 |
| M5 | 2 | 40/40 | 72 | 48 | 88 | 0 | 1024 | 7 | 0 | 40 | 0.20 | 0.45 |
| N1 | 2 | 40/40 | 95 | 48 | 88 | 5 | 1029 | 11 | 5 | 36 | 0.16 | 0.34 |
| N2 | 3 | 40/40/45 | 57 | 48 | 88 | 0 | 1007 | 12 | 0 | 41 | 0.15 | 0.34 |
| O1 | 2 | 40/40 | 112 | 47 | 88 | 0 | 1034 | 10 | 0 | 40 | 0.15 | 0.34 |
| P1 | 3 | 40/40/45 | 30 | 48 | 88 | 0 | 1054 | 10 | 0 | 41 | 0.19 | 0.45 |
| a1 | 2 | 40/40 | 69 | 48 | 88 | 0 | 1054 | 13 | 0 | 41 | 0.52 | 0.52 |
| b1 | CRACKING OCCURS IN HOT-ROLLING |
| c1 | CRACKING OCCURS IN HOT-ROLLING |
| d1 | CRACKING OCCURS IN HOT-ROLLING |
| e1 | CRACKING OCCURS IN HOT-ROLLING |

| TEST NUMBER | PRIMARY COOLING | | RETENTION TIME PERIOD FROM COMPLETION OF PRIMARY COOLING TO START OF SECONDARY COOLING (sec) | SECONDARY COOLING AVERAGE COOLING RATE (°C/s) | COOLING AFTER SECONDARY COOLING TO COILING | | COILING TEMPERATURE (°C) | PLATING | | T1 (°C) | Ms POINT (°C) | REMARKS |
|---|---|---|---|---|---|---|---|---|---|---|---|---|
| | t/t1 | PRIMARY COOLING AMOUNT (°C) | | | AIR COOLING TIME PERIOD (sec) | AIR COOLING START TEMPERATURE (°C) | | PRESENCE/ABSENCE OF PLATING | PRESENCE/ABSENCE OF ALLOYING | | | |
| K1 | 1.99 | 120 | 1.7 | 105 | 0 | — | 231 | ABSENCE | ABSENCE | 886 | 451 | INVENTION EXAMPLE |
| K2 | 1.25 | 126 | 1.7 | 96 | 8 | 730 | 197 | ABSENCE | ABSENCE | 886 | 451 | INVENTION EXAMPLE |
| K3 | 2.26 | 118 | 1.5 | 120 | 0 | — | 150 | ABSENCE | ABSENCE | 886 | 451 | INVENTION EXAMPLE |
| K4 | 2.31 | 115 | 1.5 | 116 | 0 | — | 178 | ABSENCE | ABSENCE | 886 | 451 | INVENTION EXAMPLE |
| K5 | 2.27 | 100 | 1.5 | 109 | 0 | — | 210 | ABSENCE | ABSENCE | 886 | 451 | COMPARATIVE EXAMPLE |
| K6 | 10.57 | 91 | 1.7 | 98 | 0 | — | 387 | ABSENCE | ABSENCE | 886 | 451 | COMPARATIVE EXAMPLE |
| K7 | 2.17 | 94 | 1.5 | 111 | 0 | — | 114 | ABSENCE | ABSENCE | 886 | 451 | COMPARATIVE EXAMPLE |
| K8 | 1.90 | 87 | 1.5 | 97 | 0 | — | 189 | ABSENCE | ABSENCE | 886 | 451 | INVENTION EXAMPLE |
| K9 | 2.09 | 101 | 1.5 | 110 | 0 | — | 284 | ABSENCE | ABSENCE | 886 | 451 | INVENTION EXAMPLE |
| K10 | 0.40 | 124 | 1.9 | 132 | 0 | — | 185 | ABSENCE | ABSENCE | 886 | 451 | COMPARATIVE EXAMPLE |

TABLE 2-2-continued

| | | | | | | | | | | |
|---|---|---|---|---|---|---|---|---|---|---|
| K11 | 2.59 | 127 | 1.9 | 86 | 0 | — | 210 | ABSENCE | ABSENCE | 886 | 451 | COMPARATIVE EXAMPLE |
| K12 | 2.27 | 30 | 1.9 | 110 | 0 | — | 239 | ABSENCE | ABSENCE | 886 | 451 | COMPARATIVE EXAMPLE |
| K13 | 1.39 | 154 | 1.9 | 67 | 0 | — | 341 | ABSENCE | ABSENCE | 886 | 451 | COMPARATIVE EXAMPLE |
| K14 | 1.80 | 111 | 1.9 | 28 | 0 | — | 177 | ABSENCE | ABSENCE | 886 | 451 | COMPARATIVE EXAMPLE |
| K15 | 1.95 | 94 | 1.7 | 78 | 0 | — | 520 | ABSENCE | ABSENCE | 886 | 451 | COMPARATIVE EXAMPLE |
| K16 | 1.96 | 87 | 1.5 | 71 | 0 | — | 406 | ABSENCE | ABSENCE | 886 | 451 | INVENTION EXAMPLE |
| K17 | 2.25 | 98 | 1.5 | 94 | 0 | — | 31 | ABSENCE | ABSENCE | 886 | 451 | INVENTION EXAMPLE |
| K18 | 2.03 | 81 | 1.5 | 98 | 3.8 | 750 | 59 | ABSENCE | ABSENCE | 886 | 451 | INVENTION EXAMPLE |
| K19 | 1.03 | 84 | 1.4 | 88 | 0 | — | 364 | PRESENCE | PRESENCE | 886 | 451 | COMPARATIVE EXAMPLE |
| L1 | 1.52 | 64 | 1.3 | 72 | 0 | — | 421 | ABSENCE | ABSENCE | 915 | 455 | INVENTION EXAMPLE |
| L2 | 2.24 | 70 | 1.4 | 68 | 0 | — | 100 | ABSENCE | ABSENCE | 915 | 455 | INVENTION EXAMPLE |
| L3 | 2.24 | 130 | 1.9 | 105 | 0 | — | 212 | ABSENCE | ABSENCE | 915 | 455 | COMPARATIVE EXAMPLE |
| L4 | 2.46 | 111 | 1.4 | 65 | 13.2 | 750 | 40 | PRESENCE | PRESENCE | 915 | 455 | INVENTION EXAMPLE |
| M1 | 2.36 | 113 | 1.9 | 105 | 0 | — | 196 | ABSENCE | ABSENCE | 867 | 404 | INVENTION EXAMPLE |
| M2 | 2.05 | 97 | 1.9 | 67 | 5 | 720 | 164 | ABSENCE | ABSENCE | 867 | 404 | INVENTION EXAMPLE |
| M3 | 1.21 | 98 | 1.9 | 81 | 0 | — | 35 | ABSENCE | ABSENCE | 867 | 404 | INVENTION EXAMPLE |
| M4 | 1.20 | 105 | 1.9 | 79 | 0 | — | 426 | ABSENCE | ABSENCE | 867 | 404 | COMPARATIVE EXAMPLE |
| M5 | 2.27 | 107 | 1.9 | 100 | 10.8 | 730 | 58 | PRESENCE | PRESENCE | 867 | 404 | INVENTION EXAMPLE |
| N1 | 2.10 | 113 | 1.9 | 91 | 0 | — | 312 | ABSENCE | ABSENCE | 863 | 419 | INVENTION EXAMPLE |
| N2 | 2.26 | 164 | 1.9 | 69 | 0 | — | 237 | ABSENCE | ABSENCE | 863 | 419 | COMPARATIVE EXAMPLE |
| O1 | 2.26 | 100 | 1.3 | 93 | 0 | — | 100 | ABSENCE | ABSENCE | 859 | 447 | INVENTION EXAMPLE |
| P1 | 2.36 | 109 | 1.9 | 90 | 0 | — | 342 | ABSENCE | ABSENCE | 966 | 336 | INVENTION EXAMPLE |

TABLE 2-2-continued

| | | | | | | | | | |
|---|---|---|---|---|---|---|---|---|---|
| a1 | 1.00 | 89 | 2.3 | 97 | 0 | 201 | ABSENCE | ABSENCE | 873 | 329 | COMPARATIVE EXAMPLE |
| b1 | | | | | CRACKING OCCURS IN HOT-ROLLING | | | | | COMPARATIVE EXAMPLE |
| c1 | | | | | | | | | | COMPARATIVE EXAMPLE |
| d1 | | | | | | | | | | COMPARATIVE EXAMPLE |
| e1 | | | | | | | | | | COMPARATIVE EXAMPLE |

(NOTE)
*¹ t1 = 0.001((Tf − T1) × P1/100)² − 0.109((Tf − T1) × P1/100) + 3.1
*² t1 ≤ t ≤ t1 × 2.5

NOTE
THAT UNDERLINE OF NUMERICAL VALUE IN TABLE INDICATES THAT IT IS OUTSIDE APPROPRIATE RANGE OF PRESENT INVENTION

TABLE 3-1

| TEST NUMBER | STEEL STRUCTURE AREA RATIO (%) | | | | | | | AVERAGE CRYSTAL GRAIN DIAMETER (μm) | RATIO OF σ(HV10)/E (HV10) | X-RAY RANDOM INTENSITY RATIOS OF GROUP OF {100}<011> TO {223}<110> ORIENTATIONS | X-RAY RANDOM INTENSITY RATIO OF {332}<113> ORIENTATION | MECHANICAL PROPERTIES rValue | | | |
|---|---|---|---|---|---|---|---|---|---|---|---|---|---|---|---|
| | FERRITE | PEARLITE | UPPER BAINITE | RETAINED AUSTENITE | LOWER BAINITE + TEMPERED MARTENSITE (1) | MARTENSITE (2) | (1)+(2) (AREA %) | | | | | rC: | r30: | rL: | r60: |
| A1 | 5.3 | 0 | 1.7 | 0.9 | 92.1 | 0 | 92.1 | 9.8 | 0.059 | 2.1 | 1.9 | 0.94 | 1.08 | 0.97 | 1.09 |
| A2 | 12.4 | 0 | 0.1 | 0.4 | 51.9 | 35.2 | 87.1 | 10.2 | 0.079 | 2.6 | 2.8 | 0.87 | 1.02 | 0.83 | 1.04 |
| A3 | 4.3 | 0 | 10.1 | 0.3 | 85.2 | 0.1 | 85.3 | 10.3 | 0.072 | 3.1 | 2.7 | 0.91 | 1.04 | 0.98 | 1.06 |
| B1 | 3.5 | 0 | 2.7 | 1.0 | 92.8 | 0 | 92.8 | 10.9 | 0.054 | 1.7 | 2.1 | 0.87 | 1.05 | 0.89 | 1.06 |
| C1 | 2.7 | 0 | 2.7 | 0 | 84.2 | 10.4 | 94.6 | 9.5 | 0.078 | 4.7 | 3.4 | 0.84 | 1.06 | 0.86 | 1.10 |
| D1 | 3.9 | 0 | 10.1 | 0.5 | 85.5 | 0 | 85.5 | 7.2 | 0.067 | 3.7 | 2.9 | 0.81 | 1.06 | 0.79 | 1.08 |
| E1 | 1.4 | 0 | 2.1 | 0.4 | 88.1 | 8.0 | 96.1 | 8.5 | 0.041 | 1.2 | 1.3 | 0.98 | 1.04 | 1.03 | 0.97 |
| E2 | 12.7 | 0 | 1.5 | 0.3 | 85.3 | 0.2 | 85.5 | 9.2 | 0.075 | 1.8 | 1.7 | 0.96 | 1.02 | 0.94 | 1.03 |
| E3 | 5.8 | 0 | 8.0 | 0.2 | 86.0 | 0 | 86.0 | 10.2 | 0.065 | 2.5 | 1.9 | 0.87 | 1.03 | 0.91 | 1.04 |
| E4 | 2.3 | 0 | 1.7 | 0.8 | 44.5 | 50.7 | 95.2 | 11.8 | 0.078 | 3.4 | 4.2 | 0.75 | 1.09 | 0.81 | 1.09 |
| E5 | 0.8 | 0 | 0.5 | 0.3 | 88.4 | 10.0 | 98.4 | 7.9 | 0.092 | 7.9 | 5.8 | 0.76 | 1.06 | 0.83 | 1.08 |
| F1 | 2.4 | 0 | 7.1 | 0.2 | 90.2 | 0.1 | 90.3 | 9.5 | 0.051 | 5.0 | 3.1 | 0.85 | 1.06 | 0.87 | 1.02 |
| F2 | 0.5 | 0 | 1.6 | 0.8 | 47.5 | 49.6 | 97.1 | 6.8 | 0.042 | 6.2 | 6.3 | 0.75 | 1.10 | 0.72 | 1.09 |
| G1 | 30.4 | 0 | 58.0 | 9.1 | 2.6 | 0 | 2.5 | 9.1 | 0.102 | 1.8 | 1.7 | 0.95 | 1.07 | 0.96 | 1.07 |
| G2 | 10.7 | 0 | 2.9 | 0.4 | 86.0 | 0 | 86.0 | 10.5 | 0.062 | 3.4 | 4.3 | 0.87 | 1.02 | 0.89 | 1.09 |
| H1 | 1.2 | 0 | 2.8 | 0.3 | 85.2 | 10.5 | 95.7 | 8.4 | 0.042 | 2.3 | 2.1 | 0.98 | 1.00 | 1.00 | 1.04 |
| H2 | 0.7 | 0 | 3.7 | 0.5 | 86.7 | 8.4 | 95.1 | 12.1 | 0.054 | 6.6 | 5.1 | 0.75 | 1.09 | 0.74 | 1.06 |
| I1 | 3.3 | 0 | 10.2 | 0.6 | 85.9 | 0 | 85.9 | 11.8 | 0.078 | 1.2 | 1.1 | 0.76 | 1.05 | 0.86 | 1.01 |
| I2 | 0.7 | 0 | 1.2 | 1.3 | 16.4 | 80.4 | 96.8 | 11.2 | 0.046 | 2.4 | 1.8 | 0.89 | 0.99 | 0.70 | 1.03 |
| I3 | 11.6 | 0 | 3.1 | 0.1 | 85.1 | 0.1 | 85.2 | 10.7 | 0.074 | 2.6 | 3.0 | 0.76 | 1.04 | 0.78 | 1.06 |
| J1 | 2.0 | 0 | 1.4 | 0.9 | 91.5 | 4.2 | 95.7 | 7.9 | 0.059 | 1.7 | 2.2 | 0.94 | 1.04 | 0.65 | 1.14 |
| J2 | 5.7 | 0 | 8.8 | 0.2 | 85.0 | 0.3 | 85.3 | 12.6 | 0.075 | 7.0 | 5.2 | 0.82 | 1.09 | 0.75 | 1.09 |
| J3 | 0.1 | 0 | 0.4 | 0.7 | 25.9 | 72.9 | 98.8 | 8.1 | 0.044 | 2.1 | 1.9 | 0.97 | 1.02 | 0.98 | 1.00 |

| TEST NUMBER | MECHANICAL PROPERTIES | | | | | BRITTLENESS DUCTILITY TRANSITION TEMPERATURE vTrs (°C.) | REMARKS |
|---|---|---|---|---|---|---|---|
| | TENSILE STRENGTH TS (MPa) | ELONGATION EL (%) | HOLE EXPANSION RATIO λ (%) | TS × λ (MPa · %) | TS × El (MPa · %) | | |
| A1 | 618 | 23.8 | 195.3 | 120695 | 14708 | −90 | INVENTION EXAMPLE |
| A2 | 612 | 26.4 | 172.5 | 105570 | 16157 | −60 | INVENTION EXAMPLE |
| A3 | 591 | 24.3 | 181.2 | 107089 | 14391 | −70 | INVENTION EXAMPLE |

TABLE 3-1-continued

|  |  |  |  |  |  |  |
|---|---|---|---|---|---|---|
| B1 | 613 | 21.8 | 196.2 | 120271 | 13363 | −90 | INVENTION EXAMPLE |
| C1 | 781 | 19.2 | 104.2 | 81380 | 14995 | −50 | INVENTION EXAMPLE |
| D1 | 783 | 20.4 | 95.7 | 74933 | 15973 | −50 | INVENTION EXAMPLE |
| E1 | 796 | 17.9 | 137.2 | 109211 | 14248 | −80 | INVENTION EXAMPLE |
| E2 | 802 | 21.3 | 116.0 | 93032 | 17083 | −60 | INVENTION EXAMPLE |
| E3 | 779 | 19.5 | 127.4 | 99245 | 15191 | −50 | INVENTION EXAMPLE |
| E4 | 790 | 14.9 | 142.9 | 112891 | 11771 | −90 | INVENTION EXAMPLE |
| E5 | 784 | 15.2 | 86.0 | 67424 | 11917 | −70 | COMPARATIVE EXAMPLE |
| F1 | 806 | 16.1 | 95.2 | 76731 | 12977 | −80 | INVENTION EXAMPLE |
| F2 | 836 | 18.7 | 75.7 | 63285 | 15633 | −90 | COMPARATIVE EXAMPLE |
| G1 | 973 | 16.3 | 40.2 | 39116 | 15860 | 30 | COMPARATIVE EXAMPLE |
| G2 | 989 | 14.1 | 51.6 | 51032 | 13945 | −40 | INVENTION EXAMPLE |
| H1 | 1042 | 11.8 | 75.2 | 78358 | 12296 | −70 | INVENTION EXAMPLE |
| H2 | 1023 | 10.4 | 42.1 | 43068 | 10639 | −30 | COMPARATIVE EXAMPLE |
| I1 | 986 | 14.5 | 58.0 | 57188 | 14297 | −40 | INVENTION EXAMPLE |
| I2 | 1062 | 10.0 | 76.0 | 80712 | 10620 | −60 | INVENTION EXAMPLE |
| I3 | 1032 | 16.4 | 54.5 | 56244 | 16925 | −50 | INVENTION EXAMPLE |
| J1 | 1087 | 10.2 | 44.0 | 47828 | 11087 | −50 | INVENTION EXAMPLE |
| J2 | 1076 | 10.1 | 45.1 | 48528 | 10868 | 20 | COMPARATIVE EXAMPLE |
| J3 | 1061 | 8.9 | 75.0 | 79575 | 9443 | −60 | INVENTION EXAMPLE |

(NOTE)
UNDERLINE OF NUMERICAL VALUE IN TABLE INDICATES THAT IT IS OUTSIDE APPROPRIATE RANGE OF PRESENT INVENTION

TABLE 3-2

| | STEEL STRUCTURE | | | | | | | | | | |
|---|---|---|---|---|---|---|---|---|---|---|---|
| | AREA RATIO (%) | | | | | | | AVERAGE CRYSTAL GRAIN DIAMETER (μm) | RATIO OF σ (HV10)/E (HV10) | X-RAY RANDOM INTENSITY RATIOS OF GROUP OF {100}<011> TO {223}<110> ORIENTATIONS | X-RAY RANDOM INTENSITY RATIO OF {332}<113> ORIENTATION |
| TEST NUMBER | FER-RITE | PEARL-ITE | UPPER BAINITE | RE-TAINED AUS-TENITE | LOWER BAINITE + TEMPERED MAR-TENSITE (1) | MAR-TEN-SITE (2) | (1) + (2) (AREA %) | | | | |
| K1 | 1.8 | 0 | 1.4 | 0.8 | 96.0 | 0 | 96.0 | 10.3 | 0.038 | 1.8 | 1.7 |
| K2 | 8.6 | 0 | 2.0 | 1.0 | 88.4 | 0 | 88.4 | 11.4 | 0.062 | 1.7 | 1.7 |
| K3 | 1.1 | 0 | 0.7 | 0.3 | 97.9 | 0 | 97.9 | 9.3 | 0.031 | 2.0 | 1.8 |
| K4 | 1.3 | 0 | 1.8 | 0.8 | 96.1 | 0 | 96.1 | 10.0 | 0.048 | 2.1 | 1.7 |
| K5 | 0.8 | 0 | 1.1 | 0.4 | 97.7 | 0 | 97.7 | 11.8 | 0.042 | 1.8 | 1.8 |
| K6 | 3.4 | 0 | 0.4 | 1.6 | 94.6 | 0 | 94.6 | 17.0 | 0.060 | 7.8 | 6.8 |
| K7 | 2.4 | 0 | 1.4 | 0.8 | 94.8 | 0.6 | 95.4 | 9.7 | 0.061 | 6.7 | 5.3 |
| K8 | 1.9 | 0 | 2.7 | 0.5 | 93.5 | 1.4 | 94.9 | 9.9 | 0.074 | 5.8 | 4.7 |
| K9 | 3.1 | 0 | 1.4 | 0.7 | 94.8 | 0 | 94.8 | 10.4 | 0.070 | 4.9 | 4.1 |
| K10 | 0.8 | 0 | 1.7 | 1.2 | 95.6 | 0.7 | 96.3 | 8.4 | 0.079 | 7.1 | 5.9 |
| K11 | 2.1 | 0 | 1.7 | 0.9 | 93.5 | 1.8 | 95.3 | 14.6 | 0.076 | 1.3 | 1.4 |
| K12 | 1.7 | 0 | 1.8 | 0.7 | 93.1 | 2.7 | 95.8 | 15.2 | 0.063 | 2.4 | 2.7 |
| K13 | 2.4 | 0 | 6.7 | 2.9 | 88.0 | 0 | 88.0 | 6.6 | 0.077 | 7.6 | 7.0 |
| K14 | 16.8 | 0 | 9.8 | 3.7 | 69.7 | 0 | 69.7 | 10.9 | 0.130 | 3.7 | 3.5 |
| K15 | 21.7 | 0 | 61.2 | 10.7 | 6.4 | 0 | 6.4 | 11.0 | 0.157 | 2.6 | 2.1 |
| K16 | 5.4 | 0 | 4.1 | 1.2 | 89.3 | 0 | 89.3 | 9.7 | 0.067 | 1.9 | 2.2 |
| K17 | 0.7 | 0 | 0.6 | 0.9 | 15.4 | 82.4 | 97.8 | 10.3 | 0.056 | 2.9 | 3.0 |
| K18 | 8.9 | 0 | 1.4 | 0.1 | 3.9 | 85.7 | 89.6 | 9.9 | 0.075 | 2.8 | 2.1 |
| K19 | 3.4 | 0 | 5.6 | 0.8 | 90.2 | 0 | 90.2 | 10.2 | 0.064 | 2.5 | 1.5 |
| L1 | 6.2 | 0 | 7.2 | 0 | 86.0 | 0.6 | 86.6 | 9.4 | 0.072 | 1.4 | 1.5 |
| L2 | 0.5 | 0 | 0.7 | 0.1 | 98.1 | 0.6 | 98.7 | 8.6 | 0.052 | 1.3 | 2.0 |
| L3 | 2.4 | 0 | 1.2 | 0.4 | 95.2 | 0.8 | 96.0 | 8.1 | 0.058 | 7.9 | 7.2 |
| L4 | 14.2 | 0 | 0 | 0 | 10.6 | 75.2 | 85.8 | 9.9 | 0.074 | 1.4 | 1.8 |
| M1 | 0.6 | 0 | 1.2 | 0.8 | 92.0 | 5.4 | 97.4 | 6.9 | 0.039 | 2.1 | 2.0 |
| M2 | 9.4 | 0 | 0 | 0.4 | 86.0 | 4.2 | 90.2 | 8.1 | 0.067 | 2.4 | 3.0 |
| M3 | 0.8 | 0 | 1.3 | 0.1 | 2.8 | 95.0 | 97.8 | 9.5 | 0.031 | 2.7 | 2.4 |
| M4 | 13.9 | 0 | 24.1 | 0.2 | 61.8 | 0 | 61.8 | 8.2 | 0.117 | 1.9 | 2.1 |
| M5 | 12.3 | 0 | 1.8 | 0.4 | 85.3 | 0.2 | 85.5 | 9.1 | 0.079 | 2.4 | 1.8 |
| N1 | 2.1 | 0 | 8.4 | 0.4 | 88.7 | 0.4 | 89.1 | 9.5 | 0.057 | 1.7 | 2.2 |
| N2 | 1.6 | 0 | 4.7 | 0.7 | 90.9 | 2.1 | 93.0 | 6.7 | 0.066 | 7.5 | 5.6 |
| O1 | 0.8 | 0 | 0.9 | 0.8 | 12 | 85.5 | 97.5 | 10.6 | 0.040 | 1.8 | 1.8 |
| P1 | 0.5 | 0 | 0 | 11.5 | 77.6 | 10.4 | 88.0 | 5.4 | 0.038 | 1.9 | 2.4 |
| a1 | 2.1 | 0 | 1.4 | 1.9 | 92.0 | 2.6 | 94.6 | 9.2 | 0.043 | 2.5 | 3.1 |
| b1 | | | | | CRACKING OCCURS IN HOT-ROLLING | | | | | | |
| c1 | | | | | | | | | | | |
| d1 | | | | | | | | | | | |
| e1 | | | | | | | | | | | |

| | MECHANICAL PROPERTIES | | | | | | | | | |
|---|---|---|---|---|---|---|---|---|---|---|
| TEST NUMBER | rVALUE | | | | TENSILE STRENGTH TS (MPa) | ELONGATION EL (%) | HOLE EXPANSION RATIO λ (%) | TS × λ (MPa · %) | TS × El (MPa · %) | BRITTLENESS DUCTILITY TRANSITION TEMPERATURE vTrs (° C.) | REMARKS |
| | rC: | r30: | rL: | r60: | | | | | | | |
| K1 | 0.96 | 1.01 | 0.93 | 0.94 | 1010 | 12.6 | 72.1 | 72821 | 12726 | −60 | INVENTION EXAMPLE |
| K2 | 0.93 | 0.97 | 0.91 | 1.01 | 997 | 15.8 | 56.5 | 56331 | 16753 | −40 | INVENTION EXAMPLE |
| K3 | 0.82 | 1.05 | 0.84 | 0.99 | 1091 | 11.0 | 65.4 | 71351 | 12110 | −70 | INVENTION EXAMPLE |
| K4 | 0.75 | 1.08 | 0.72 | 1.05 | 1021 | 10.5 | 75.0 | 76575 | 10721 | −60 | INVENTION EXAMPLE |
| K5 | 0.68 | 1.11 | 0.71 | 0.94 | 1050 | 10.4 | 46.2 | 48510 | 10920 | −80 | COMPARATIVE EXAMPLE |
| K6 | 0.72 | 1.08 | 0.75 | 1.07 | 987 | 13.7 | 42.9 | 42342 | 13522 | 10 | COMPARATIVE EXAMPLE |
| K7 | 0.76 | 1.05 | 0.80 | 1.06 | 1043 | 10.3 | 45.1 | 47039 | 10743 | −50 | COMPARATIVE EXAMPLE |
| K8 | 0.79 | 1.01 | 0.83 | 1.08 | 1040 | 9.7 | 51.6 | 53664 | 10088 | −60 | INVENTION EXAMPLE |
| K9 | 0.71 | 1.04 | 0.67 | 1.12 | 1031 | 9.6 | 48.6 | 50107 | 9898 | −50 | INVENTION EXAMPLE |

TABLE 3-2-continued

| ID | | | | | | | | | | | Category |
|---|---|---|---|---|---|---|---|---|---|---|---|
| K10 | 0.74 | 1.07 | 0.72 | 1.00 | 1002 | 10.4 | 48.9 | 48998 | 10421 | −60 | INVENTION EXAMPLE |
| K11 | 0.87 | 1.03 | 0.86 | 1.02 | 1026 | 6.8 | 51.4 | 52736 | 6987 | 20 | COMPARATIVE EXAMPLE |
| K12 | 0.86 | 1.04 | 0.91 | 1.01 | 1039 | 7.5 | 59.0 | 61301 | 7793 | −10 | COMPARATIVE EXAMPLE |
| K13 | 0.72 | 1.07 | 0.81 | 1.07 | 997 | 13.7 | 41.0 | 40877 | 13659 | −40 | COMPARATIVE EXAMPLE |
| K14 | 0.84 | 1.04 | 0.87 | 1.01 | 991 | 14.5 | 42.2 | 41820 | 14370 | 0 | COMPARATIVE EXAMPLE |
| K15 | 0.83 | 1.07 | 0.88 | 1.03 | 989 | 15.7 | 41.0 | 40549 | 15527 | 30 | COMPARATIVE EXAMPLE |
| K16 | 0.91 | 1.00 | 0.97 | 0.99 | 1000 | 13.1 | 57.9 | 57900 | 13100 | −40 | INVENTION EXAMPLE |
| K17 | 0.71 | 1.07 | 0.81 | 0.93 | 1108 | 9.1 | 67.5 | 74790 | 10083 | −70 | INVENTION EXAMPLE |
| K18 | 0.88 | 1.08 | 0.91 | 1.00 | 1013 | 14.7 | 55.7 | 56424 | 14891 | −40 | INVENTION EXAMPLE |
| K19 | 0.81 | 1.06 | 0.94 | 1.08 | 997 | 12.5 | 69.1 | 68893 | 12463 | −50 | INVENTION EXAMPLE |
| L1 | 0.92 | 1.05 | 0.96 | 1.02 | 1020 | 13.7 | 59.4 | 60588 | 13974 | −40 | INVENTION EXAMPLE |
| L2 | 1.01 | 1.00 | 0.97 | 1.02 | 1098 | 7.0 | 68.0 | 74664 | 7686 | −70 | INVENTION EXAMPLE |
| L3 | 0.70 | 1.09 | 0.69 | 1.10 | 1066 | 6.3 | 45.0 | 47970 | 6716 | −70 | COMPARATIVE EXAMPLE |
| L4 | 0.97 | 1.02 | 0.97 | 0.98 | 1045 | 14.8 | 55.4 | 57893 | 15466 | −40 | INVENTION EXAMPLE |
| M1 | 0.94 | 1.01 | 0.97 | 1.03 | 1240 | 9.7 | 58.6 | 72664 | 12028 | −50 | INVENTION EXAMPLE |
| M2 | 0.92 | 1.07 | 0.94 | 1.08 | 1191 | 12.3 | 47.5 | 56573 | 14649 | −40 | INVENTION EXAMPLE |
| M3 | 0.98 | 1.02 | 0.99 | 1.05 | 1238 | 8.7 | 56.2 | 69576 | 10771 | −50 | INVENTION EXAMPLE |
| M4 | 0.96 | 1.05 | 0.94 | 1.07 | 1164 | 13.0 | 39.2 | 45629 | 15132 | 0 | COMPARATIVE EXAMPLE |
| M5 | 0.97 | 1.02 | 0.98 | 1.03 | 1204 | 11.9 | 42.2 | 50809 | 14328 | −40 | INVENTION EXAMPLE |
| N1 | 1.00 | 1.05 | 0.84 | 1.05 | 1250 | 10.6 | 49.9 | 62375 | 13250 | −40 | INVENTION EXAMPLE |
| N2 | 0.78 | 1.10 | 0.75 | 1.09 | 1197 | 10.5 | 38.1 | 45606 | 12569 | −60 | COMPARATIVE EXAMPLE |
| O1 | 0.85 | 0.97 | 0.71 | 1.06 | 1055 | 9.8 | 72.1 | 76066 | 10339 | −50 | INVENTION EXAMPLE |
| P1 | 0.98 | 1.02 | 0.97 | 1.03 | 1340 | 6.5 | 62.3 | 83482 | 8710 | −50 | INVENTION EXAMPLE |
| a1 | 0.82 | 1.02 | 0.93 | 1.03 | 1469 | 3.0 | 20.1 | 29527 | 4407 | −20 | COMPARATIVE EXAMPLE |
| b1 | CRACKING OCCURS IN HOT-ROLLING | | | | | | | | | | COMPARATIVE EXAMPLE |
| c1 | | | | | | | | | | | COMPARATIVE EXAMPLE |
| d1 | | | | | | | | | | | COMPARATIVE EXAMPLE |
| e1 | | | | | | | | | | | COMPARATIVE EXAMPLE |

(NOTE)
UNDERLINE OF NUMERICAL VALUE IN TABLE INDICATES THAT IT IS OUTSIDE APPROPRIATE RANGE OF PRESENT INVENTION

The invention claimed is:
1. A hot-rolled steel sheet comprising:
a chemical composition comprising: in mass %,
C: 0.01 to 0.2%;
Si: 0.001 to 2.5%;
Mn: 0.10 to 4.0%;
P: 0.10% or less;
S: 0.030% or less;
Al: 0.001 to 2.0%;
N: 0.01% or less;
Ti: (0.005+48/14[N]+48/32[S])%≤Ti≤0.3%;
Nb: 0 to 0.06%;
Cu: 0 to 1.2%;
Ni: 0 to 0.6%;
Mo: 0 to 1%;
V: 0 to 0.2%;
Cr: 0 to 2%;
Mg: 0 to 0.01%;
Ca: 0 to 0.01%;
REM: 0 to 0.1%; and
B: 0 to 0.002%,
with a balance being composed of Fe and impurities;
an texture in which, at a central portion of a sheet thickness that is a steel sheet portion sectioned at a ⅜ thickness position and a ⅝ thickness position of the sheet thickness from a surface of the steel sheet, an average value of X-ray random intensity ratios of a group of {100}<011> to {223}<110> orientations of a sheet plane is 6.5 or less and an X-ray random intensity ratio of a {332}<113> crystal orientation is 5.0 or less; and a microstructure in which a total area ratio of tempered martensite, martensite and lower bainite is more than 85%, and an average crystal grain diameter is 12.0 μm or less.

2. The hot-rolled steel sheet according to claim 1, wherein the chemical composition contains one or two or more selected from a group consisting of: in mass %,
Nb: 0.005 to 0.06%;
Cu: 0.02 to 1.2%;
Ni: 0.01 to 0.6%;
Mo: 0.01 to 1%;
V: 0.01 to 0.2%; and
Cr: 0.01 to 2%.

3. The hot-rolled steel sheet according to claim 1, wherein the chemical composition contains one or two or more selected from a group consisting of: in mass %, Mg: 0.0005 to 0.01%, Ca: 0.0005 to 0.01%, and REM: 0.0005 to 0.1%.

4. The hot-rolled steel sheet according to claim 1, wherein the chemical composition contains, in mass %, B: 0.0002 to 0.002%.

5. The hot-rolled steel sheet according to claim 1, comprising the microstructure in which assuming that an average value of hardness is E (HV0.01) and a standard deviation is σ (HV0.01) when measuring the Vickers hardness at 100 points or more with a load of 0.098 N, σ (HV0.01)/E (HV0.01) is 0.08 or less.

6. The hot-rolled steel sheet according to claim 1, comprising mechanical properties that an r value (rC) in a direction perpendicular to a rolling direction is 0.70 or more, and an r value (r30) in a direction 30° from the rolling direction is 1.10 or less.

7. The hot-rolled steel sheet according to claim 1, comprising mechanical properties that an r value (rL) in a rolling direction is 0.70 or more and an r value (r60) in a direction 60° from the rolling direction is 1.10 or less.

8. The hot-rolled steel sheet according to claim 1, comprising a plating layer provided on the surface of the steel sheet.

9. A manufacturing method of a hot-rolled steel sheet according to claim 1, which comprises: sequentially performing rough hot rolling, finish hot rolling, primary cooling and secondary cooling on a slab comprising a chemical composition comprising in mass %
C: 0.01 to 0.2%;
Si: 0.001 to 2.5%;
Mn: 0.10 to 4.0%;
P: 0.10% or less;
S: 0.030% or less;
Al: 0.001 to 2.0%;
N: 0.01% or less;
Ti: $(0.005+48/14[N]+48/32[S])\% \leq Ti \leq 0.3\%$;
Nb: 0 to 0.06%;
Cu: 0 to 1.2%;
Ni: 0 to 0.6%;
Mo: 0 to 1%;
V: 0 to 0.2%;
Cr: 0 to 2%;
Mg: 0 to 0.01%;
Ca: 0 to 0.01%;
REM: 0 to 0.1%; and
B: 0 to 0.002%,
with a balance being composed of Fe and impurities;
and coiling a resultant slab into the hot-rolled steel sheet, wherein:

the finish hot rolling is hot rolling in which with respect to a temperature T1 defined in a following expression (1), a maximum reduction ratio per pass in a first temperature region of 1004° C. or higher and (T1+200)° C. or lower is 41% or more, a total reduction ratio in the first temperature region is 50% or more, a total reduction ratio in a second temperature region of T1° C. or higher and lower than (T1+30)° C. is 0 to 30%, and the rolling is completed in the first temperature region or the second temperature region;

the primary cooling is water cooling that satisfies a following expression (2) and achieves a cooling amount of 40° C. or higher and 140° C. or lower;

the secondary cooling is water cooling that is started within three seconds after the primary cooling and performs cooling at an average cooling rate of 30° C./sec or higher; and the coiling is to coil the slab at a temperature CT satisfying a following expression (3), $$T1(°\text{C.})=850+10\times(C+N)\times Mn+350\times Nb+250\times Ti+40\times B+10\times Cr+100\times Mo+100\times V \quad (1)$$

$$1 \leq t/t1 \leq 2.5 \quad (2)$$

$$CT(°\text{C.}) \leq \max[Ms,350] \quad (3)$$

$$t1=0.001\times\{(Tf-T1)\times P1/100\}^2-0.109\times\{(Tf-T1)\times P1/100\}+3.1 \quad (4)$$

$$Ms(°\text{C.})=561-474\times C-33\times Mn-17\times Ni-21\times Mo \quad (5)$$

where in the expression (1) and the expression (5), a symbol of each element is a content (mass %) of the element in the steel, in the expression (2), t is a time period (sec) from a final reduction in the reduction in one pass at 30% or more in the first temperature region to start of the primary cooling, and t1 is a time period (sec) decided by the above expression (4), in the expression (3), max[ ] is a function of returning a maximum value among arguments, and Ms is a temperature decided by the above expression (5), and in the expression (4), Tf and P1 are a steel sheet temperature and a reduction ratio (%) in the final reduction in the reduction in one pass at 30% or more in the first temperature region respectively.

10. The manufacturing method of the hot-rolled steel sheet according to claim 9, wherein the rough hot rolling achieves a maximum reduction ratio per pass in a temperature region of 1000° C. or higher and 1200° C. or lower of 40% or more, and an austenite average grain diameter of 200 μm or less.

11. The manufacturing method of the hot-rolled steel sheet according to claim 9, wherein a maximum heat generation due to plastic deformation in a temperature region of (T1+30)° C. or higher and (T1+150)° C. or lower of the finish hot rolling is 18° C. or lower.

12. A manufacturing method of a hot-rolled steel sheet comprising: performing a plating treatment on the surface of the hot-rolled steel sheet obtained by the manufacturing method of the hot-rolled steel sheet according to claim 9.

* * * * *